(12) United States Patent
Chen et al.

(10) Patent No.: US 8,068,491 B2
(45) Date of Patent: Nov. 29, 2011

(54) METHODS FOR RELIABLE MULTICASTING IN LOCAL PEER GROUP (LPG) BASED VEHICLE AD HOC NETWORKS

(75) Inventors: Wai Chen, Parsippany, NJ (US); John Lee, Howell, NJ (US); Ryokichi Onishi, Jersey City, NJ (US); Toshiro Hikin, Tama (JP)

(73) Assignees: Telcordia Technologies, Inc., Piscataway, NJ (US); Toyota Infotechnology Center, U.S.A., Inc., Palo Alto, CA (US)

(*) Notice: Subject to any disclaimer, the term of this patent is extended or adjusted under 35 U.S.C. 154(b) by 748 days.

(21) Appl. No.: 12/069,815

(22) Filed: Feb. 13, 2008

(65) Prior Publication Data

US 2009/0201928 A1 Aug. 13, 2009

(51) Int. Cl.
*H04L 12/28* (2006.01)
*H04J 3/26* (2006.01)

(52) U.S. Cl. ........................ 370/390; 370/432

(58) Field of Classification Search .................. 370/389, 370/392, 432
See application file for complete search history.

(56) References Cited

U.S. PATENT DOCUMENTS

| | | | | |
|---|---|---|---|---|
| 5,519,704 | A * | 5/1996 | Farinacci et al. | 370/402 |
| 7,085,869 | B1 * | 8/2006 | Acharya et al. | 710/263 |
| 7,356,578 | B1 * | 4/2008 | Eatough | 709/223 |
| 2005/0207354 | A1 * | 9/2005 | Nekovee et al. | 370/260 |
| 2005/0232281 | A1 * | 10/2005 | Rosenzweig et al. | 370/400 |
| 2005/0286477 | A1 | 12/2005 | Gupta et al. | |
| 2006/0171322 | A1 | 8/2006 | Lee | |
| 2007/0115975 | A1 | 5/2007 | Zhang | |
| 2008/0317047 | A1 * | 12/2008 | Zeng et al. | 370/401 |

OTHER PUBLICATIONS

International Search Report, dated Apr. 8, 2009.

* cited by examiner

*Primary Examiner* — Chirag Shah
*Assistant Examiner* — Jenkey Van
(74) *Attorney, Agent, or Firm* — Philip J. Feig

(57) ABSTRACT

A method for routing a multicast message comprising the steps of receiving a multicast message including at least a message, a source identifier, a sequence number, a time-to-live value and a multicast group destination, determining if the multicast group destination is in a multicast forwarding table, determining if the message has been previously received, adding the multicast message to the multicast forwarding table if it is determined that the multicast message has not been previously received, determining if a node that received the multicast message is a forwarding node; randomly setting a wait time for forwarding the multicast message; and forwarding the multicast message at the expiration of the wait time.

5 Claims, 20 Drawing Sheets

FIG. 5

| GroupAdd | SOURCE IDENTIFIER | SeqNum |
|---|---|---|
| 225.1.1.1 | 192.168.1.1 | 2122 |
| 255.1.1.1 | 192.168.1.1 | 2121 |

| GroupAdd | SOURCE IDENTIFIER | SeqNum | MP CACHE | ACK STATUS | RETRAN_TIMER | s_mp_c | C_MP_TTL |
|---|---|---|---|---|---|---|---|
| 225.1.1.1 | 192.168.1.1 | 2122 | $mp_2$ | NOT ACKed | ON | 1 | 61 |
| 255.1.1.1 | 192.168.1.1 | 2121 | $mp_1$ | ACKed | OFF | 2 | 61 |

| GroupAdd | SOURCE IDENTIFIER | SeqNum | MP CACHE | ACK STATUS | RETRAN_TIMER | s_mp_c | C_MP_TTL | NACK_RETRAN_TIMER |
|---|---|---|---|---|---|---|---|---|
| 225.1.1.1 | 192.168.1.1 | 2122 | $mp_2$ | NOT ACKed | ON | 1 | 61 | ON |
| 255.1.1.1 | 192.168.1.1 | 2121 | $mp_1$ | ACKed | OFF | 2 | 61 | OFF |

| GroupAdd | SOURCE IDENTIFIER | SeqNum | NACK_RETRAN_TIMER | MP CACHE |
|---|---|---|---|---|
| 225.1.1.1 | 192.168.1.1 | 2122 | ON | $mp_2$ |
| 255.1.1.1 | 192.168.1.1 | 2121 | OFF | $mp_1$ |

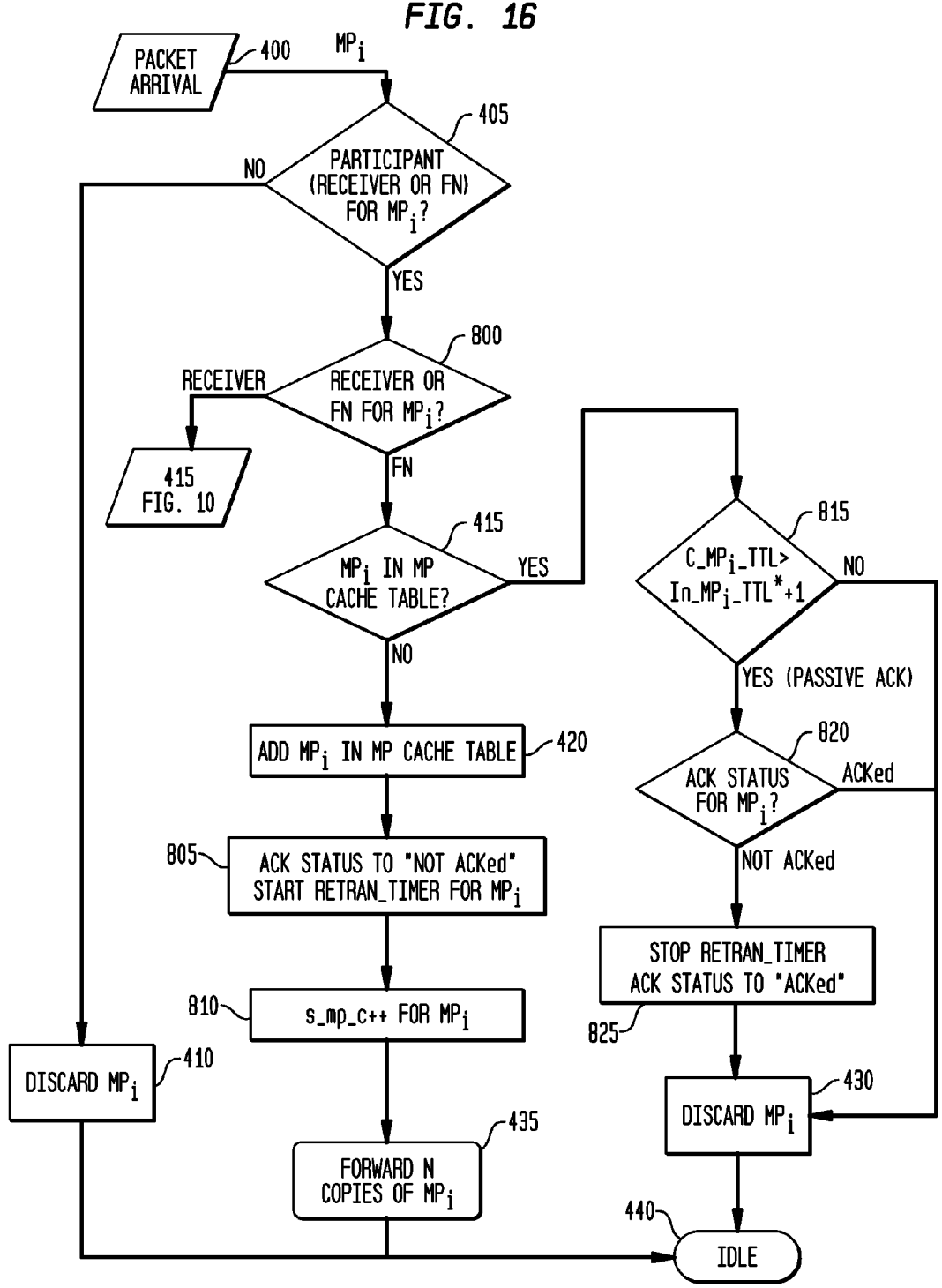

| GroupAdd | SOURCE IDENTIFIER | SeqNum | MP CACHE | s_mp_c | C_MP_TTL | RANDOM_FORWARD_TIMER |
|---|---|---|---|---|---|---|
| 225.1.1.1 | 192.168.1.1 | 2122 | $mp_2$ | 0 | 61 | ON |
| 255.1.1.1 | 192.168.1.1 | 2121 | $mp_1$ | 1 | 61 | OFF |

METHODS FOR RELIABLE MULTICASTING IN LOCAL PEER GROUP (LPG) BASED VEHICLE AD HOC NETWORKS

CROSS-REFERENCE TO RELATED APPLICATIONS

The present invention is related to commonly owned, co-pending U.S. patent application Ser. No. 11/585,047 filed Oct. 23, 2006 entitled Method and Communication Device for Routing Unicast and Multicast Messages in an Ad-hoc Wireless Network (the "'047 Application").

FIELD OF INVENTION

This invention relates to a communication network in a mobile environment. More specifically, the invention relates to methods for routing a multi-hop multicast message between a plurality of moving devices.

Wireless communication has become common in all aspects of life today, whether it be a wireless home or office network, so-called "hotspot" networks at local cafes, fast food chains or hotels, or even citywide implementations of WiFi technologies. The aim of this wireless push in society is to provide accessibility to information and to increase the productivity that society as a whole has enjoyed through the wide acceptance and utilization of computer networks and especially the Internet.

This desire to become a society of wireless communication has even extended to moving devices such as a moving vehicle. This type of wireless networking may appear in many aspects of vehicle safety applications, including, but not limited to, urgent road obstacle warning, intersection coordination, hidden driveway warning, lane-change or merging assistance.

Vehicle safety communications ("VSC") may be broadly categorized into vehicle-to-vehicle and vehicle-with-infrastructure communications. In vehicle-to-vehicle communication, vehicles communicate with each other without support from a stationary infrastructure. Vehicles communicate with each other when they are within the same radio range of each other or when multiple-hop relay via other vehicles is possible. In vehicle-with-infrastructure communication, vehicles communicate with each other with the support of infrastructure such as roadside wireless access points. In this case, vehicles may also communicate with the infrastructure only.

Key VSC performance requirements include low latency (on the order of 100 milli-seconds) and sustained throughput (or equivalently, the percentage of neighboring vehicles that successfully receive warning messages) in order to support various VSC applications such as collision avoidance.

The '047 Application describes a method for organizing groups of moving vehicles into a local peer group by selecting one moving vehicle as a group header, maintaining the local peer group using the group header, and generating local routing information. The moving vehicles are adapted for uni-cast and multicast routing. However, there is still a need to have multicast routing methods that can increase the throughput and have a low latency.

SUMMARY OF THE INVENTION

Accordingly, disclosed is a method for routing a multicast message. The method comprises the steps of receiving a multicast message including at least a message, a source identifier a sequence number, a time-to-live value and a multicast group destination, determining if the multicast group destination is in a multicast forwarding table, determining if the message has been previously received, adding the multicast message to the multicast forwarding table if it is determined that the message has not been previously received, determining if a node that received the multicast message is a forwarding node, setting randomly a wait time for forwarding the multicast message and forwarding the multicast message at the expiration of the wait time.

If the message has been previously received, the wait time is stopped if a second multicast message is received from a downstream node including at least the same message, source identifier, sequence number, and multicast group destination within the randomly set time. When the wait time is stopped, the multicast message is not forwarded.

The determination of whether a second multicast message is received from a downstream node comprises the steps of extracting a time-to-live value from the second multicast message, adding a preset number to the time-to-live value to generate an offset time-to-live value, retrieving a time-to-live value from the multicast forwarding table for the multicast message that includes the same message and comparing the offset time-to-live value with the retrieved time-to-live value, wherein the wait time is stopped, if the retrieved time-to-live value is greater than the offset time-to-live value.

The wait time is reset to a random value if the retrieved time-to-live value is equal to the offset time-to-live value.

The method further comprises the steps of setting an acknowledgement flag to not acknowledged after forwarding and setting a retransmission time to a predetermined time. If the message has been previously received, the method further comprises the step of stopping the retransmission time if a second multicast message is received from a downstream node including at least the same message, source identifier, sequence number, and multicast group destination. The acknowledgement flag is set to acknowledged after the retransmission time is stopped.

The method further comprises the steps of retransmitting the multicast message when the retransmission time expires and setting the transmission time to the predetermined time, after retransmission.

The method further comprises the steps of determining if a retransmission limit has been reached, retransmitting the multicast message when the retransmission time expires based upon said determining, incrementing a retransmission counter, and setting the retransmission time to the predetermined time, after retransmission. If the retransmission limit has been reached, the retransmission time is stopped.

The multicast forwarding table includes the group destination, the source identifier, the sequence number, the message, the acknowledgement flag, the retransmission time value, the retransmission counter, and the time-to-live value.

Also disclosed is another method for routing a multicast message. The method comprises the steps of receiving a multicast message including at least a message, a source identifier, a sequence number, a time-to-live value and a multicast group destination, determining if the multicast group destination is in a multicast forwarding table, determining if the message has been previously received, adding the multicast message to the multicast forwarding table if it is determined that the multicast message has not been previously received, determining if a node that received the multicast message is a multicast receiving node, randomly assigning a probability number for the multicast receiving node, comparing the randomly assigned probability number with a preset probability threshold and forwarding the multicast message based upon the comparison.

The method further comprises the step of setting the preset probability threshold.

The multicast forwarding table includes the group destination, source identifier and sequence number.

The method further comprises the steps of setting an acknowledgement flag to not acknowledged after forwarding and setting a retransmission time to a predetermined time.

The method further comprises the step of incrementing a retransmission counter.

If the message has been previously received, the method further comprises the step of stopping the retransmission time if a second multicast message is received from a downstream node including at least the same message, source identifier, sequence number, and multicast group destination.

The acknowledgement flag is set to acknowledged after the retransmission time is stopped.

The method further comprising the steps of determining if a retransmission limit has been reached based upon a value of the retransmission counter, retransmitting the multicast message when the retransmission time expires based upon the determining, incrementing the retransmission counter; and setting the retransmission time to the predetermined time, after retransmission. If the retransmission limit has been reached, the retransmission time is stopped.

Also disclosed is another method for routing a multicast message. The method comprises the steps of receiving a multicast message including at least a message, a source identifier, a sequence number, a time-to-live value, and a multicast group destination, determining if the multicast group destination is in a multicast forwarding table, determining if the message has been previously received; if the message has been previously received, the method comprises the steps of adding a preset number to the time-to-live value to generate an offset time-to-live value, comparing the offset time-to-live value with a time-to-live value in the multicast forwarding table, and discarding the multicast message if the offset time-to-live value is greater than or equal to the time-to-live value in the multicast forwarding table.

If the message has not been previously received, the method comprises the steps of setting an acknowledgement flag to not acknowledged, incrementing a retransmission counter, setting a retransmission time to a predetermined value and forwarding the multicast message.

If the offset time-to-live value is less than the time-to-live value in the multicast forwarding table, the method comprises the steps of setting an acknowledgement flag to acknowledged and stopping a retransmission time.

BRIEF DESCRIPTION OF THE DRAWINGS

These and other features, benefits, and advantages of the present invention will become apparent by reference to the following figures, with like reference numbers referring to like structures across the views, wherein:

FIG. 5 illustrates an exemplary MP cache table for a forwarding node and a multicast receiver node according to the first embodiment of the invention;

FIG. 11 illustrates an exemplary MP cache table for a forwarding node according to the third embodiment of the invention;

FIG. 15A illustrates an exemplary MP cache table for a forwarding node according to the fourth embodiment of the invention;

FIG. 15B illustrates an exemplary MP cache table for a multicast receiver node according to the fourth embodiment of the invention;

FIG. 16 illustrates a method for routing a multicast packet according to a fifth embodiment of the invention;

FIG. 21 illustrates an exemplary MP cache table for a forwarding node according to the any of the seventh through ninth embodiments of the invention.

DETAILED DESCRIPTION OF THE INVENTION

Definitions

A "Node" is a router that implements the channel determination and selection process or method as specified in the following description. For example, a moving vehicle having a communication device is a node. For the purposes of this application, a node and moving vehicle are interchangeably used.

A "multicast message" is a message with greater or equal to one destination. For the purposes of the detailed description a multicast message is referenced as a multicast packet (MP). A "hop" is a number of nodes in which a message is relayed. A "hop count" between two nodes, i.e., source to a destination, is equal to the number of relay nodes plus 1.

In accordance with the invention, nodes or moving vehicles that have been organized into local peer groups (LPG) will exchange information related to its relative location, its unique identifier and its LPG in order to generate a multicast routing table. The routing table is generated based upon information in control packets, such as heartbeat message and a membership report message, which will be described later. Multicasting deals with multiple sources nodes 700 and multicast receiver nodes 20 per multicast session.

An LPG 1 is dynamically formed from a plurality of nodes 10 in the immediate vicinity. Specifically, a first node broadcasts a radio signal; other nodes 10 within the range of the first node have the ability to receive the radio signal. Since the LPG 1 is formed based on radio coverage, nodes within an LPG 1 can communicate with each other via a single-hop or a multi-hop without a need for any fixed infrastructure. The LPG is formed and maintained based upon the transmission of heartbeat messages and membership reports.

Figure 1:
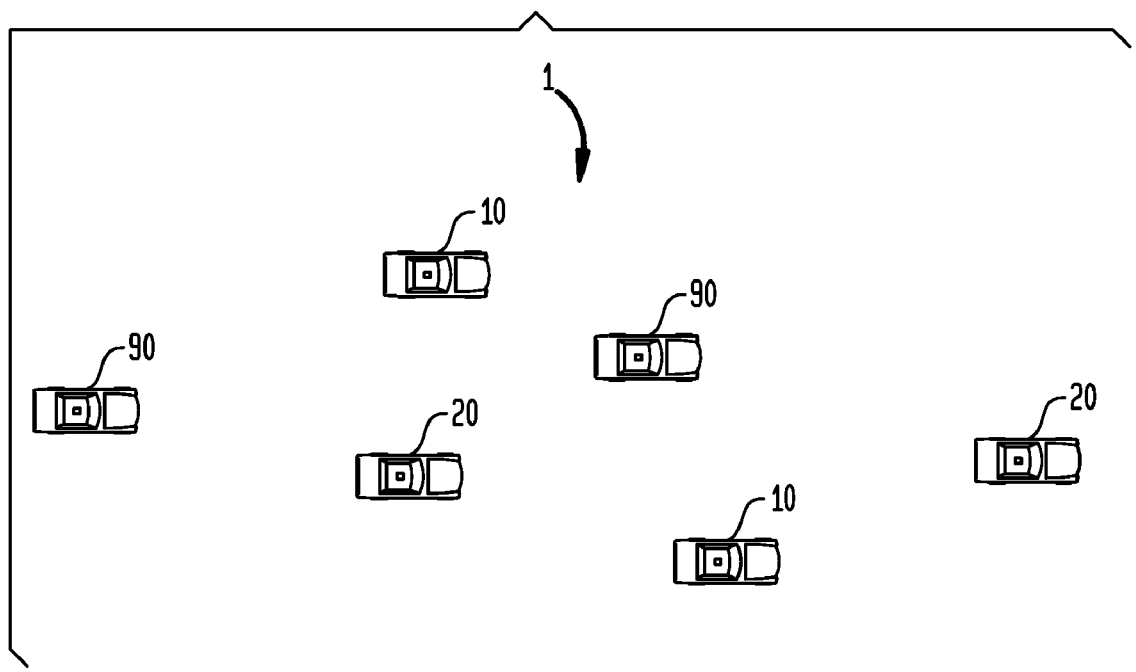
FIG. 1 illustrates an exemplary local peer group as configured for a multicast message.

FIG. 1 illustrates an example of an LPG 1 having modes configured for a multicast session. For multicasting, nodes 10 are divided into two groups: a multicast receiver node and a forwarding node 90. Multicast receiver nodes 20 are the intended receivers of the multicast messages. Forwarding nodes 90 forward the message. All nodes 10 within an LPG 1 are capable of being a forwarding node or a multicast receiver node 20. Additionally, one node in the LPG 1 is selected to be a group Header (GH). A GH is a moving device or node 10 within the LPG 1 that is designated to maintain and control the LPG 1 without any ordering of the nodes or any infrastructure. A node 10 becomes an FN 90 if it is used to relay a membership report to a GH. The formation, maintenance, selection of a GH and control of an LPG 1 is described in the '047 Application which is hereby incorporated by reference.

Figure 2:
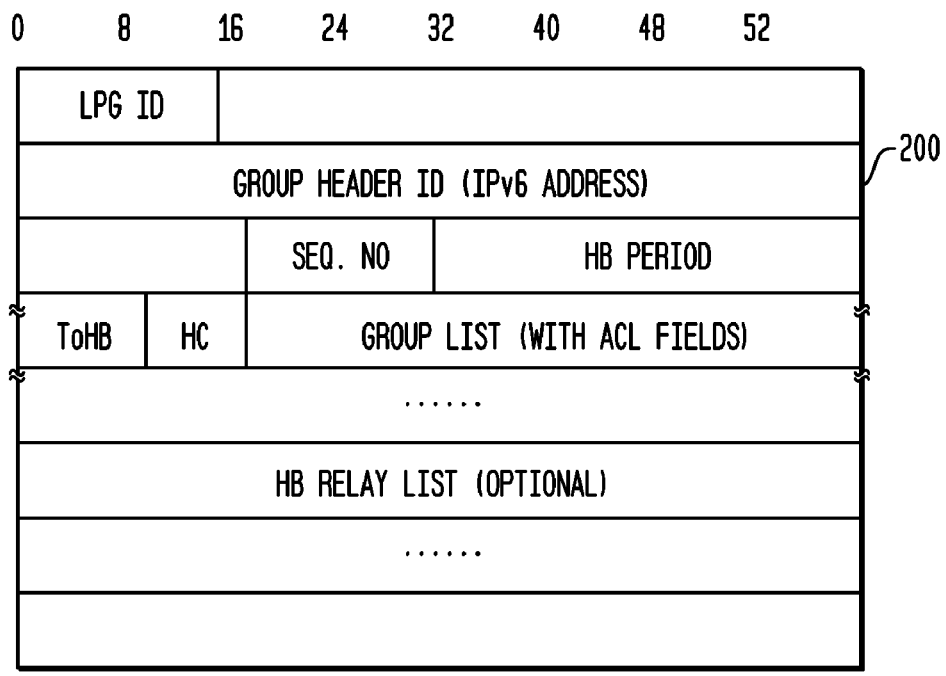
FIG. 2 illustrates an exemplary heartbeat message.

FIG. 2 illustrates an example of a heartbeat message 200 in accordance with the invention. The GH periodically sends out a heartbeat message 200 identifying the LPG 1 and providing information regarding the LPG 1. This period is a fixed interval (T). The value of the interval (T) is selectable based on design or operational needs. The GH also maintains a list of all of the nodes in the LPG 1. This list includes a time stamp of when a node enters the LPG 1 or when GH receives a status update from the node. The list is used for various management and control functions for the LPG 1. For example, the list can be used to track group size, create and update the multicast routing table, and header resolution. Additionally, this list is periodically broadcast to all of the other nodes in the LPG 1. The heartbeat message 200 is broadcast to all nodes 10 within a LPG 1.

The heartbeat message 200 will include the identifier of the LPG 1, the GH identification, a sequence number, and the type of heartbeat message, e.g., heartbeat with complete group list, incremental group list or no group list. In one embodiment, the heartbeat message will include a complete group list in every packet. Using a complete group list is the most accurate way to control routing and maintain a correct list of group members; however, there is a significant amount of bandwidth needed for the heartbeat message with a complete group. In another embodiment, every n-th heartbeat message 200 will include a complete group list. For example, each third heartbeat includes a complete group list. ToHb will indicate the type of heartbeat message. The type of heartbeat message is influenced by the topology change rate of the LPG 1 and frequency of broadcast of the heartbeat. As the topology change rate of an LPG 1 increases, there is a greater need for a complete group list being included in all heartbeat messages 200.

The heartbeat message 200 will include the hop count (HC) from the GH. Initially, the HC is set at a predetermined value, e.g., 1. Every time the heartbeat message 200 is relayed by a node, the relay node increases the HC value by 1, i.e., HC=HC+1. The HC value can be used to limit the LPG size, to indicate the staleness of the information within the heartbeat message 200 and to control routing of the control packets to reduce overhead. For each LPG 1, there is a maximum hop count for routing, e.g., 10. Once the HC is incremented to the maximum hop count, the control packet will not be relayed.

The usage of a maximum hop count, HC and Seq. No. prevents infinite duplications of control packets within the LPG 1. The hop count can also be used for a relay strategy. When a node forwards the heartbeat message it will include its ID information in the message so that next hop nodes know who relayed the heartbeat message 200.

As set forth above, a heartbeat message 200 can also include a Group List. A Group List can include information regarding the members of the LPG 1, such as the number of members in the LPG 1, IP addresses for each number, the hop count from the GH, and a classification.

A classification can be a code that references a relative direction from the GH, e.g., uplink, downlink, and peer. A peer classification indicates that a node is within the same wireless coverage area from the GH, i.e., all of the peer nodes have the same hop count from the GH. Upstream nodes are determined by the heartbeat. Downstream nodes are determined based upon a membership report (MR) 300 which will be explained later. Upstream transmission represents communication towards the GH 25 and downstream transmission represents communication away from the GH 25. This classification is a relative term. Each node can classify its neighbors into three different classes. If the membership report of another node has 1 less hop count (HC) than the HC of the node, the node is an upstream node. If the HC is the same with its own HC, the node is a peer. If the HC is 1 greater than its own HC, the node is a downstream node.

Figure 3:
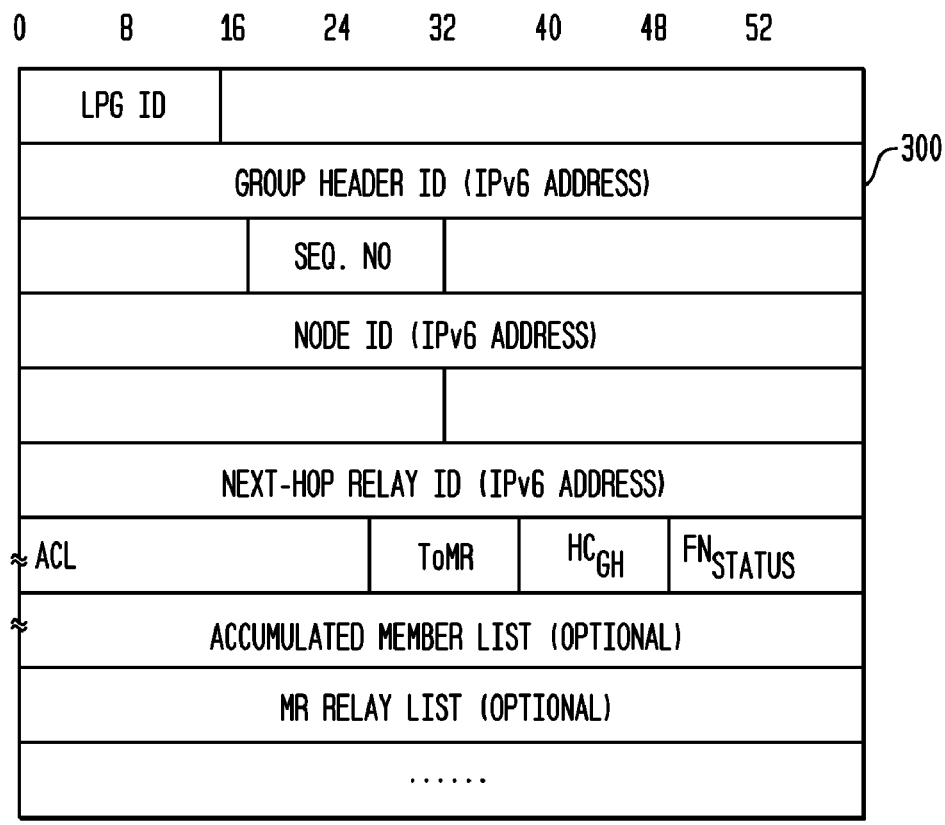
FIG. 3 illustrates an exemplary membership report message.

FIG. 3 illustrates an example of a membership report (MR) 300. An MR 300 is a control packet broadcast by a node other than a GH and the recipient is the GH 25. The MR 300 is generated in response to a heartbeat message 200. The MR 300 includes collectable routing information such as a membership list, downstream node identifications, and next hop for downstream nodes. An MR 300 includes some of the same information as the heartbeat message 200: the GID and the Group Header Id. The MR 300 will also include an MR Seq. No. The MR Seq. No. is similar to the Seq. No for the heartbeat message 200 and is used to maintain order of the MR's. The MR. Seq. No. is the MR order for one particular node. Typically, the MR Seq. No. has the same value with the Seq. No. of the heartbeat message 200 that triggered the MR 300.

The Node ID of the originating node is also included in the MR 300, i.e., node that generated the MR 300.

The MR 300 also includes a Next-hop relay ID. The Next-hop relay ID is relay instructions for the MR 300 towards the GH. The next hop information is determined directly from the received heartbeat message 200. When a node 10 receives a new or fresh heartbeat message 200, it recovers the previous relaying node's identification from the IP layer and MAC layer before any packet processing. The previous relaying node's identification is stored in memory and used as the Next-hop relay ID for the MR 300. When a node 10 forwards a heartbeat message 200, the node 10 includes its ID in the packet. The receiving next hop node will store this ID when the node receives a new or fresh heartbeat message 200, as the next hop relay ID to reach the GH 25. A new or fresh heartbeat message 200 has a newer sequence number with the lowest HC.

The MR 300 also includes a "Type of MR indicator" ToMR. There are two types of MRs 300: a single member and aggregated multiple member report. A single member MR only includes an MR 300 from the originating node. An aggregated multiple member report includes the MR 300 of more than one node 10. The aggregated report can be used to reduce the overhead and bandwidth needed for control packets. One MR 300 is sent containing multiple MRs.

Additionally, the MR 300 can include a Hop count from the GH ($HC_{GH}$). ($HC_{GH}$) is the HC value from the GH to the originating node of the MR 300. The MR 300 will include an available channel list for the reporting node. Additionally, the MR can include an available channel list for all nodes that relayed the MR 300 towards the GH. Additionally, the MR 300 will include its status or availability for relaying a multicast message, i.e., a forwarding node status.

The multicast routing table is created from the heartbeat message 200 and the MR 300 after a multicast session is initiated. The multicast routing table can be best visualized as a tree or mesh. The tree or mesh provides paths or links from any source node 700 through an FN to a multicast receiver node 20. To establish a multicast session, nodes 10 interested in a multicast session launch a multicast application program corresponding to the multicast session. The application program is stored in memory. Accordingly, the nodes become either an FN or a multicast receiver node and release signals (MRs 300) indicating their interest to join the session. These signals initiate the generation of a multicast tree for the multicast session.

If a node relays the MR 300 towards the GH, the node becomes an FN 90 for the multicast group. The FN 90 can accept and forward multicast packets associate with the multicast session according to one or more of the methods described herein. The tree or mesh, i.e., multicast routing table is created using one of the methods described in the '047 Application, which is explicitly incorporated by reference herein. The multicast routing table is updated every heartbeat period. A multicast packet is routed using the multicast routing table.

Figure 4:
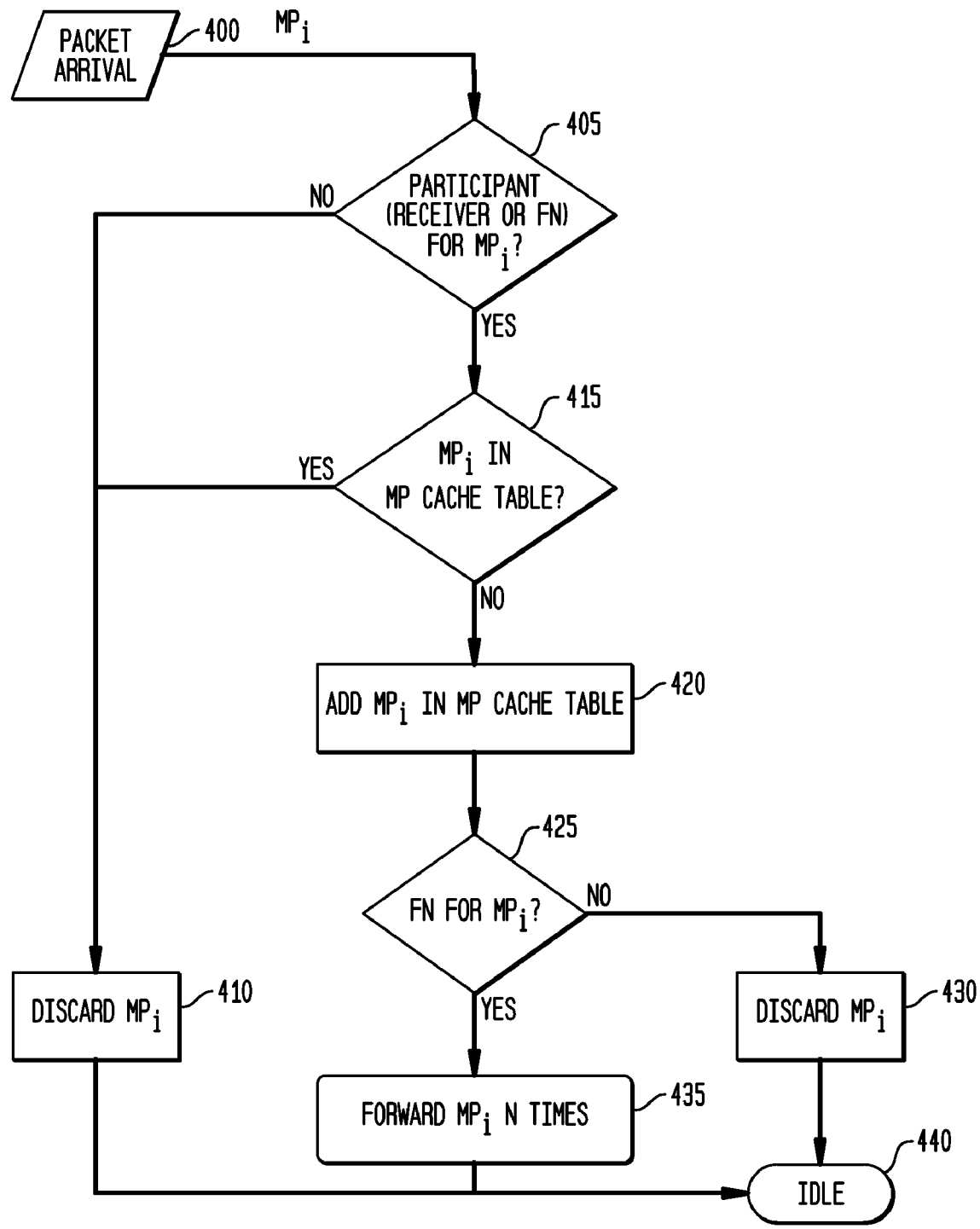
FIG. 4 illustrates a method for routing a multicast packet according to a first embodiment of the invention.

FIG. 4 illustrates a multicast routing method according to a first embodiment of the invention. The routing method will be described using functional blocks of the method. The same functional blocks in different embodiments will be referenced using the same numerals.

A multicast packet arrives at a node 10, at block 400. The node 10 extracts a multicast group identifier from the packet to determine if the node 10 is a member of the multicast session, at block 405. This determination is based upon the multicast routing table. A node 10 is a member of the multicast session if it is either an FN 90 or a multicast receiver node 20. If the node 10 is not a member of the multicast session, the multicast packet is discarded without any other processing, at block 410. If the node 10 is a member of the multicast session, the node 10 looks for a match for the received multicast packet in the MP cache table (e.g. FIG. 5, 500), at block 415. In the first embodiment of the invention, the MP cache table 500 is the same for both an FN 90 and a multicast receiver node 20. The MP cache table 500 includes a group identifier, a source identifier, i.e., the original source node 700 of the multicast packet and a sequence number. A multicast packet is the same as a packet received if both the sequence number of the packet and the source identifier are the same. If the multicast packet is the same, the multicast packet is discarded without any other processing, at block 410.

If the multicast packet is not the same as any of the packets in the MP cache table 500, the node 10 adds information related to the multicast packet, such as the group identifier, the source identifier, the sequence of the multicast packet to the MP cache table 500, at block 420. Once the multicast packet is added to the MP cache table 500, the node 10 determines if it is an FN 90 for the multicast session, at block 425. This determination is based upon the multicast routing table. If the node 10 is not an FN 90 for the multicast session, the multicast packet is discarded, at block 430. The node 10 then becomes idle, at block 440.

If the node 10 is an FN 90 for the multicast session, the node re-multicasts or forwards the received multicast packet N-times, at block 435. In an embodiment, the FN 90 forwards the multicast packet N-consecutive times. The number "N" times that the packet is forwarded are preset and can be varied. There is a tradeoff in an increase in the delivery ratio and the increase in data overhead. As the number "N" increases there is a significant increase in the data overhead, but the delivery ratio also increases. In another embodiment, the FN 90 simultaneously forwards the packet N times.

After the multicast packet is forwarded, the FN 90 becomes idle, at block 440.

FIG. 5 illustrates an example of a MP cache table 500 for the first embodiment of the invention. As depicted in FIG. 5, the MP cache table 500 includes an added group (GroupAdd), which is the identifier of the session or group, e.g., IP address, a source identifier (SourceAdd), which is the identifier of the source node 700 of the multicast packet and a sequence number for the packet (SeqNum).

Figure 6:
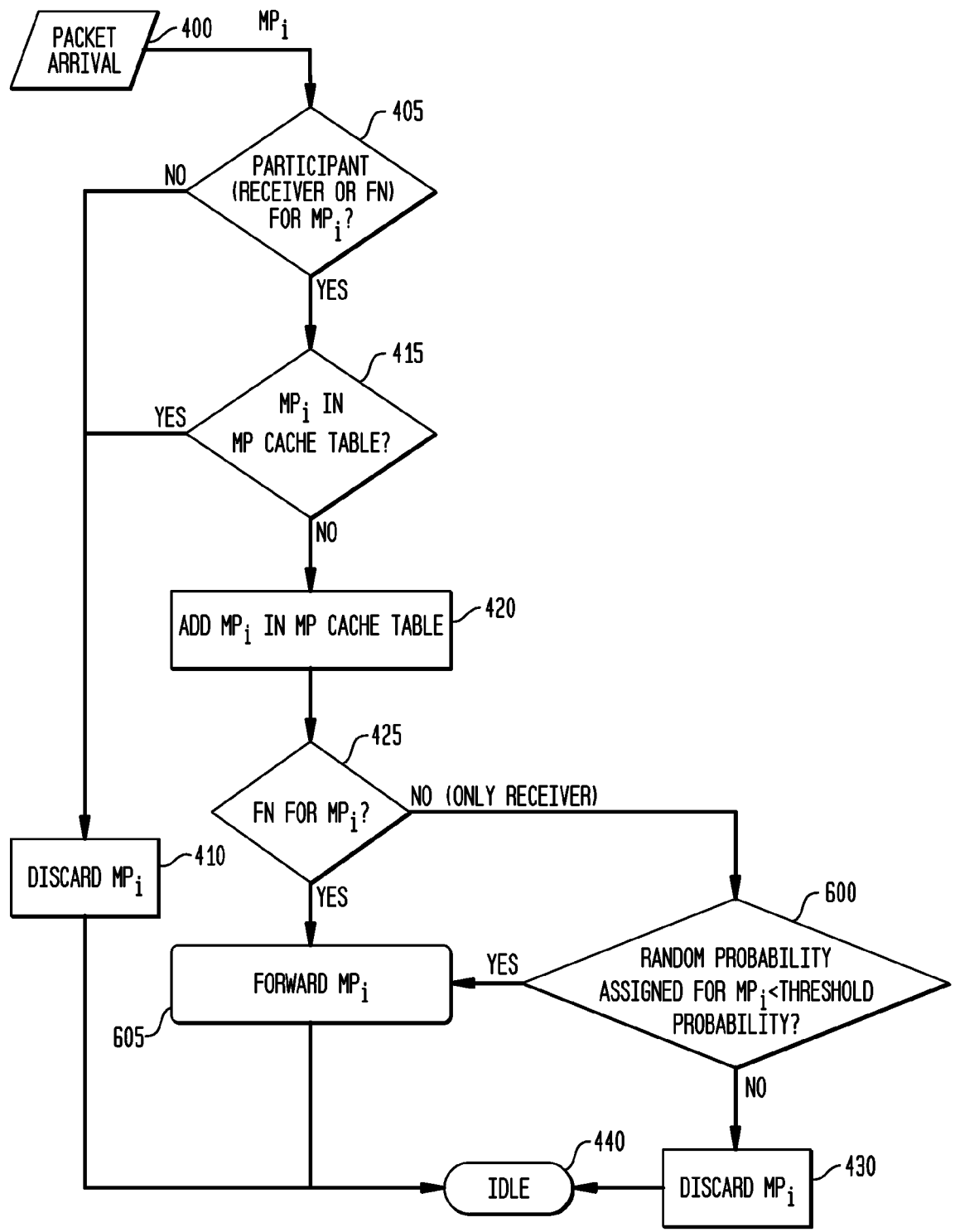
FIG. 6 illustrates a method for routing a multicast packet according to a second embodiment of the invention.

FIG. 6 illustrates a multicast routing method according to a second embodiment of the invention. A multicast packet arrives at a node 10, at block 400. The node 10 extracts a multicast group identifier from the packet to determine if the node 10 is a member of the multicast session, at block 405. This determination is based upon the multicast routing table. A node 10 is a member of the multicast session if it is either an FN 90 or a receiver node 20. If the node 10 is not a member of the multicast session, the multicast packet is discarded without any other processing, at block 410. If the node 10 is a member of the multicast session, the node 10 looks for a match for the received multicast packet in the MP cache table 500, at block 415. In the second embodiment of the invention, the MP cache table 500 is the same for both an FN 90 and a receiver node. The MP cache table 500 includes a group identifier, source identifier and a sequence number. A multicast packet is the same as a packet received if both the source identifier and the sequence number of the packet are the same. If the multicast packet is the same, the multicast packet is discarded without any other processing, at block 410.

If the multicast packet is not the same as any of the packets in the MP cache table 500, the node 10 adds information about the received multicast packet to the MP cache table 500, at block 420. Once information related to the multicast packet is added to the MP cache table 500, the node 10 determines if it is an FN 90 for the multicast session, at block 425. This determination is based upon the multicast routing table. If the node 10 is an FN 90, then the node 10 forwards the multicast packet once, at block 605. The node 10 becomes idle, at block 440.

If the node 10 is not an FN 90, the node 10 is a multicast receiver node 20. According to this embodiment, certain multicast receiver nodes 20 are selected to forward the multicast packet, in addition to the normal forwarding by the FNs 90. This additional forwarding reduces the likelihood of a packet being missed by a member of the multicast session. The certain multicast receiver nodes 20 are selected based on a probability assigned for each incoming multicast data packet. Each multicast receiver node 20 is programmed with a probability threshold value. The probability threshold value is between 0 and 1. The probability threshold value is not the same for multiple multicast receiver nodes 20. In an embodiment, the probability threshold value is randomly programmed. In another embodiment, the probability threshold value is assigned based upon the number of nodes 10 within a LPG 1 or the number of nodes within the multicast session. In other words, the probability threshold value can periodically change. In an embodiment, the source node 700 of the multicast session can assign the probability threshold value. Alternatively, the GH can assign the probability threshold value.

At block 600 a node 10, which is a multicast receiver node 20, compares the random probability assigned for the multicast packet with its probability threshold value. If the random probability assigned for the multicast packet is less than the probability threshold value, the multicast receiver node forwards the received multicast packet, at block 605. The multicast receiver node 20 then becomes idle, at block 440.

If the random probability assigned for the multicast packet is greater than or equal to the probability threshold value, the multicast receiver node 20 discards the received multicast packet, at block 430. The multicast receiver node 20 then becomes idle, at block 440.

Figure 7:
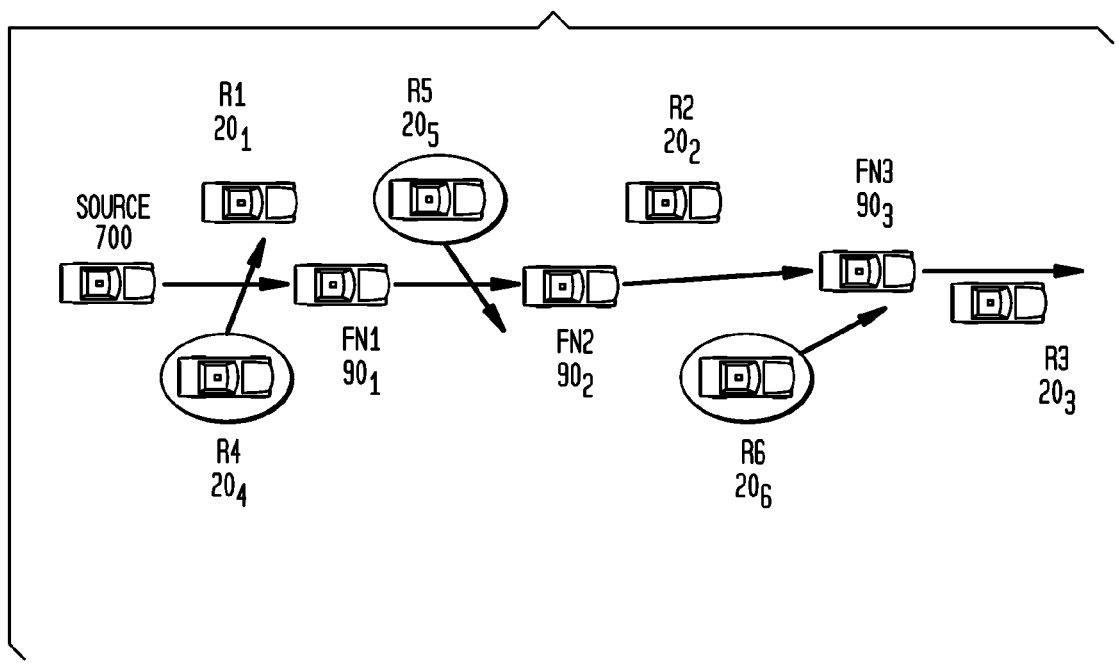
FIG. 7 illustrates an example of the routing method according to the second embodiment of the invention.

FIG. 7 illustrates an example of a multicast session performing the method according to the second embodiment of the invention. The source node 700 initiates a multicast session and multicasts a multicast packet. $FN_1$ $90_1$, $FN_2$ $90_2$ and $FN_3$ $90_3$ will forward the multicast packet after reception of the multicast packet, at block 605. Multicast receiver nodes $20_1$, $20_2$ and $20_3$ do not forward the multicast data packet and discard the multicast packet (block 430). However, multicast receiver nodes $20_4$, $20_5$ and $20_6$ will forward the multicast packet (block 605). The MP cache table is the same as in the first embodiment of the invention (e.g. 500). The MP cache table 500 is the same for both an FN 90 and a multicast receiver node 20.

Figure 8:
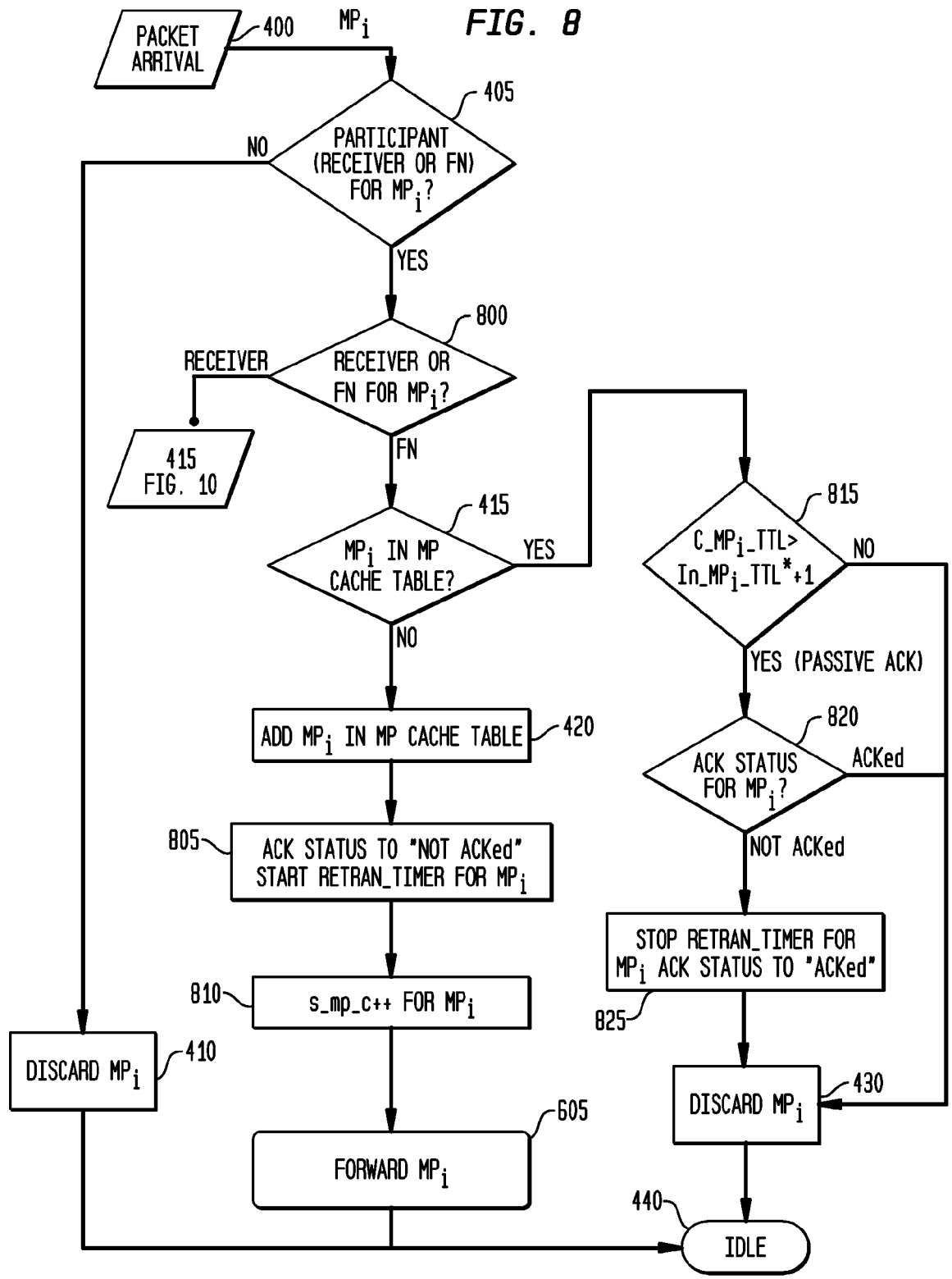
FIGS. 8-10 illustrate a method for routing a multicast packet according to a third embodiment of the invention.
Figure 9:
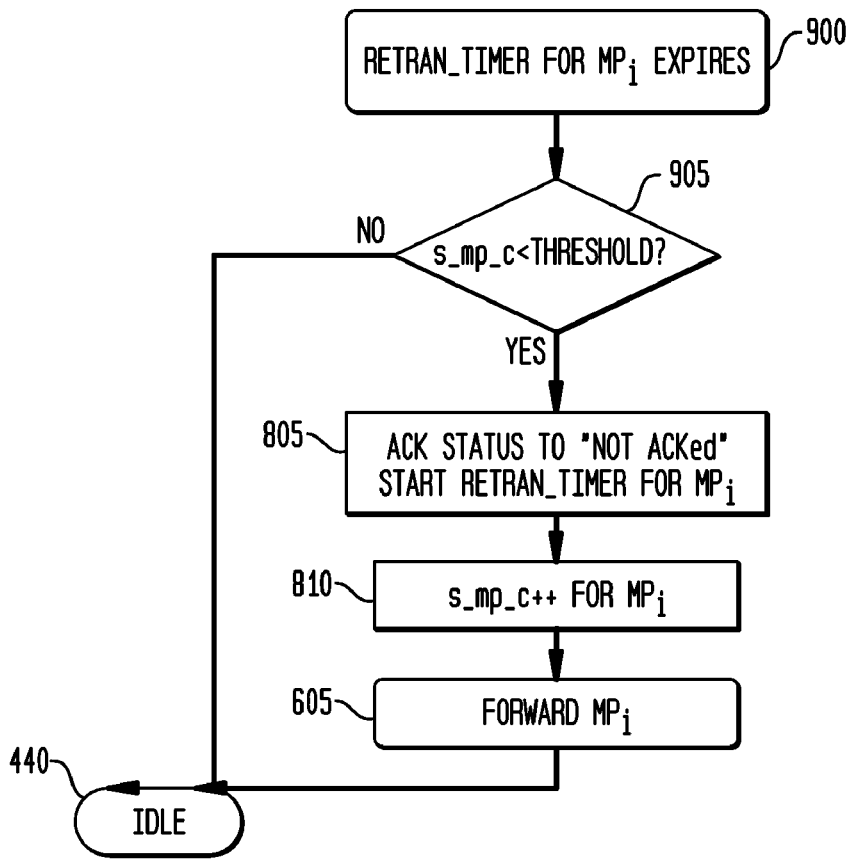
Figure 10:
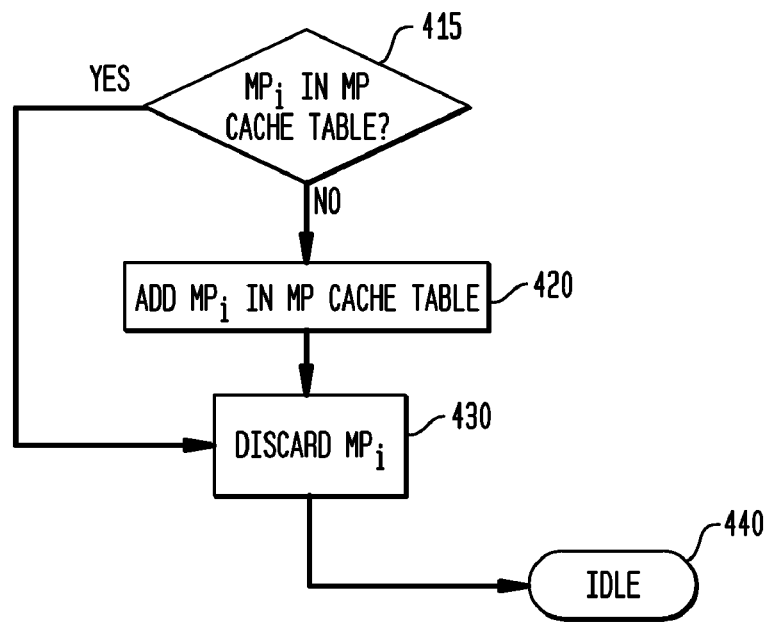

FIGS. 8-10 illustrate a routing method according to a third embodiment of the invention. According to the third embodiment of the invention, a next hop node acknowledges a forwarded multicast packet. This acknowledgement is in the form of a passive acknowledgement. A multicast packet forwarded by one FN 90 is acknowledged by a multicast packet which is forwarded by its next hop FN. The multicast packet, which is forwarded by the next hop FN, is overheard.

A multicast packet arrives at a node 10, at block 400. The multicast packet includes a multicast group identifier, a sequence number, a time-to-live (TTL) value and the data. The TTL value is the number of hops that the multicast packet is relayed. At each hop, the FN 90 reduces the TTL value. The TTL value functions to limit the number of times the same multicast data packet is forwarded.

The node 10 extracts a multicast group identifier from the packet to determine if the node 10 is a member of the multicast session, at block 405. This determination is based upon the multicast routing table. If the node 10 is not a member of the multicast session, the multicast packet is discarded without any other processing, at block 410. If the node 10 is a member of the multicast session, the node 10 determines if it is an FN 90 or a multicast receiver node, at block 800. If the node 10 is a multicast receiver node, the process moves to functional block 415 of FIG. 10. If the node 10 is an FN 90 for the multicast session, the FN 90 determines if the multicast packet is in the MP cache table (e.g. FIG. 11, 500a), at block 415 (FIG. 8).

If the multicast packet is not the same as any of the packets in the MP cache table 500a, the FN 90 adds the received multicast packet to the MP cache table 500a, at block 420. In this embodiment, both information related to the multicast packet as well as the packet is added to the MP cache table 500a.

The FN 90 extracts the multicast group identifier, a sequence number, source identifier, a time-to-live (TTL) value and the data and adds this information to the MP cache table 500a. Additionally, the FN 90 initializes a retransmission counter to zero. The retransmission counter (s_mp_c) represents a number of times that a multicast packet can be retransmitted. In an embodiment, the number of times that a multicast message is retransmitted is limited to a preset maximum. The preset maximum can be the same for all nodes 10. In other embodiment, the preset maximum can be variable for specific nodes, such as a GH or a source node 700.

The MP cache table is different for an FN 90 and a multicast receiver node. For an FN 90, the MP cache table 500a will include the multicast session identifier, source identifier, the sequence number, the multicast packet data, an acknowledgement status, a retransmission timer value, a retransmission counter and a TTL value for the multicast packet. The acknowledgment status can be either "not Acknowledged" or "Acknowledged". The retransmission timer value can be either on or off. If the timer is on, the retransmission timer value will also include the initial set timer value and an indication when the retransmission timer value has expired. For a multicast receiver node 20, the MP cache table 500 includes only the multicast session identifier, source identifier and the sequence number.

At block 805, the FN 90 initializes the acknowledgement status to "not Acknowledged". The FN 90 can track which multicast packet has been acknowledged and received. Additionally, the FN 90 initializes the retransmission timer value to on and sets a timer with a retransmission time. The retransmission time can be variable dependent on the number of nodes, the type of data included in the data packet, the speed of motion of the FNs 90 and other user defined criterion. For example, a retransmission time of 12 ms can be used. If the data included in the message is a high priority message, the retransmission time can be shortened. Alternatively, if the message is a lower priority message, the retransmission time can be lengthened. A recovery delay depends on the value of the retransmission time. The smaller the retransmission time is, the shorter the delay. However, too small leads to many retransmissions, some of which might not be needed.

At block 810, the retransmission counter is incremented by one, i.e., s_mp_c+1. After the retransmission counter is incremented, the FN 90 forwards the multicast packet once, at block 605. The FN 90 subtracts one from the TTL value of the multicast packet before forwarding. Therefore, the multicase packet that is received by the next hop FN will have a lower TTL value. The FN 90 becomes idle, at block 440.

If the multicast packet is the same as any of the packets in the MP cache table 500a, the FN 90, the method processes to block 815.

The FN 90 determines the TTL value for the incoming multicast packet. As noted above, the TTL value is used to control the number of hops for a specific multicast packet. Additionally, in this embodiment, the TTL value is also used to determine the relative location of a transmitting and receiving node 10. Specifically, each time a multicast packet is forwarded the node 10 subtracts one from the TTL value (e.g., TTL−1). A multicast packet received from a node 10 that is downstream from a particular FN 90 will have a TTL value that is less than the TTL value for the same multicast packet that was forwarded by the FN 90. A multicast packet received from a node 10 that is upstream from a particular FN 90 will have a TTL value that is greater than the TTL value for the same multicast packet that was forwarded by the FN 90. A multicast packet received from a node 10 that is the same number of hops as the particular FN 90 will have the same TTL value.

The FN 90 adds an offset value of one to the determined TTL value to account for the forwarding of the multicast packet in the first instance by the FN 90. This generates an offset TTL value At block 815, the FN 90 compares the offset TTL value (In_MP_TTL+1) of the incoming packet with the TTL value of the same multicast packet. The TTL value of the same multicast packet is retrieved from the MP cache table 500a. If the TTL value retrieved from the MP cache table 500a is not greater than the offset value, then the incoming multicast packet is ignored and discarded, at block 430. The multicast packet originated from an upstream node. The forwarding of the multicast packet is not acknowledged. The FN 90 becomes idle, at block 440.

If, at block 815, the TTL value retrieved from the MP cache table is greater than the offset value, then the FN 90 determines if the multicast packet is already acknowledged, at block 820.

The FN 90 retrieves the acknowledgement status for the same multicast packet from the MP cache table 500*a*. If the same multicast packet has already been acknowledged, then the incoming multicast packet is ignored and discarded, at block 430. The FN 90 becomes idle, at block 440. There is no change in the MP cache table 500*a*. If the same multicast packet has not been acknowledged, at block 820, the method processed to block 825.

At block 825, the FN 90 stops the retransmission timer. Additionally, the FN 90 changes the retransmission timer value in the MP cache table 500*a* to "off" and changes the acknowledgement status to "Acknowledged". Afterwards, the incoming multicast packet is discarded, at block 430. The FN 90 becomes idle, at block 440. The forwarding of the multicast packet is acknowledged.

FIG. 9 illustrates the functional blocks when the retransmission timer expires before the forwarding of the multicast packet is acknowledged. The functional blocks illustrates in FIG. 9 are only performed by an FN 90.

At block 900, the retransmission timer expires. The FN 90 determines if the retransmission counter has reached its maximum threshold value. The FN extracts the retransmission counter from the MP cache table 500*a* for the multicast packet that corresponds to the packet having its retransmission timer expired. The retransmission counter is compared with the maximum threshold value. If the retransmission counter is equal to or greater than the maximum threshold value, the FN 90 becomes idle, at block 440.

If the retransmission counter is less than the maximum threshold value, the FN 90 resets the transmission timer for the multicast packet and initiates the acknowledgment status for the multicast packet to "not Acknowledged", at block 805 (illustrated in FIG. 9 as "Not ACKed").

At block 810, the retransmission counter is incremented by one, i.e., s_mp_c+1. After the retransmission counter is incremented, the FN 90 forwards the multicast packet once, at block 605. The FN 90 subtracts one from the TTL value of the multicast packet before forwarding. Therefore, the next hop FN will receive a multicast packet with a lower TTL value than the FN 90 that is sending the multicast packet. The FN 90 becomes idle, at block 440.

FIG. 10 illustrates the functional blocks for the multicast receiver nodes 20 according to the third embodiment of the invention. As illustrated in FIG. 8, if the node 10 is not an FN 90, at block 800, the process moves to block 415 of FIG. 10. At block 415, the multicast receiver node 20 determines if the incoming multicast packet is listed in the MP cache table 500. If the multicast packet is already listed, the packet is ignored and discarded, at block 430. The multicast receiver node 20 becomes idle, at block 440.

If the multicast packet is not the same as any of the packets in the MP cache table 500, the multicast receiver node 20 adds information about the incoming multicast packet to the MP cache table 500, at block 420. Specifically, the multicast receiver node 20 adds the multicast session identifier, source identifier and the sequence number for the multicast packet to the MP cache table 500. Afterwards, the multicast packet is discarded, at block 430. The multicast receiver node 20 becomes idle, at block 440.

FIG. 11 illustrates an example of an MP cache table 500*a* for an FN according to the third embodiment of the invention. As depicted, the MP cache table 500*a* includes two different multicast packets, (MP$_1$, and MP$_2$). For each multicast packet, the MP cache table 500*a* includes a multicast session identifier (GroupAdd), source identifier for the multicast packet, the sequence number for the multicast packet (SeqNum), the multicast packet data (MP cache), the acknowledgment status (ACK status), a retransmission timer (Retran_Timer), a retransmission counter (s_mp_c) and a TTL value for the multicast packet (C_MP_TTL). As depicted in FIG. 11, one of the multicast packets has been acknowledged and, therefore, the retransmission timer status is "off".

Figure 12:
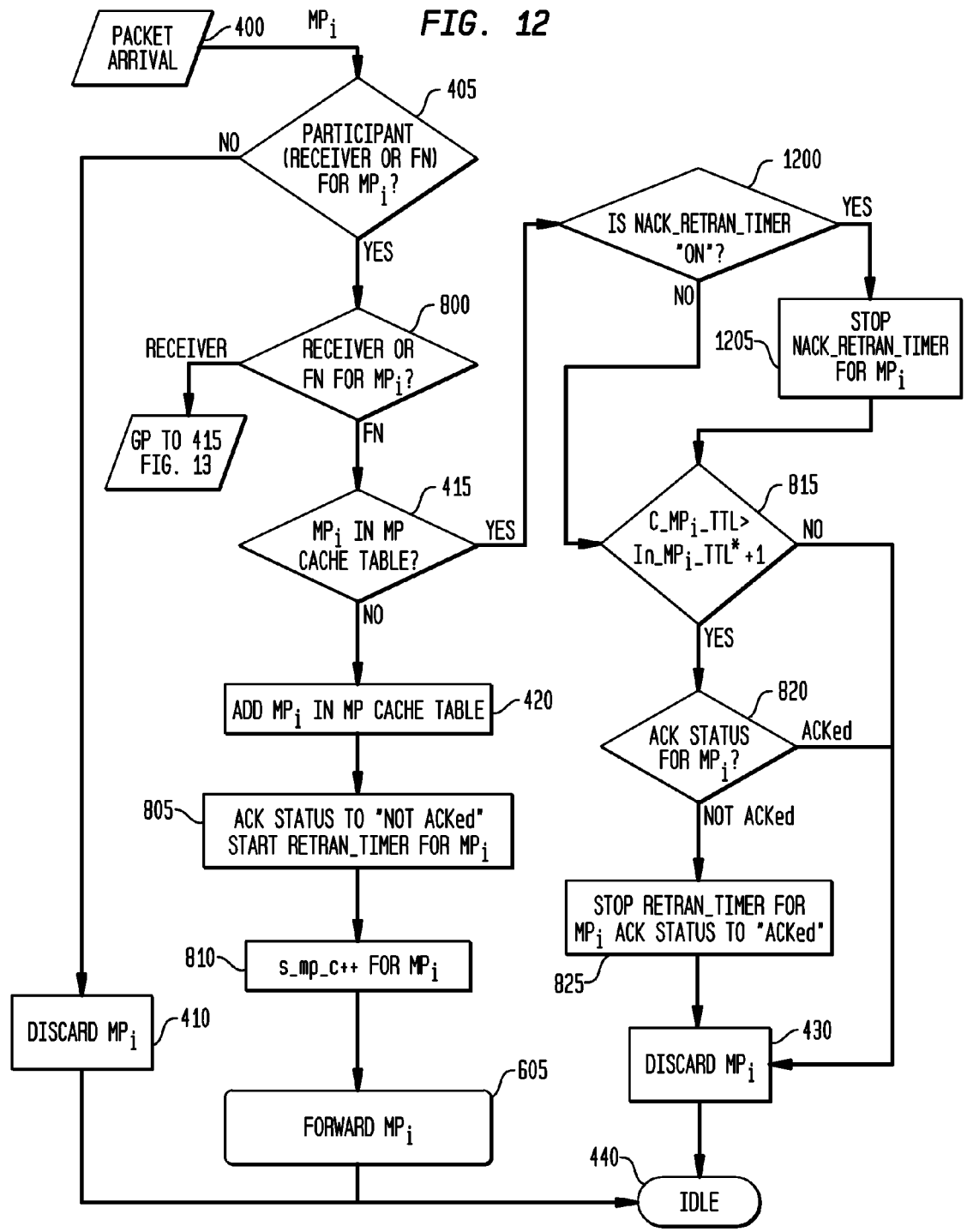
FIGS. 12-14B illustrate a method for routing a multicast packet according to a fourth embodiment of the invention.
Figure 13:
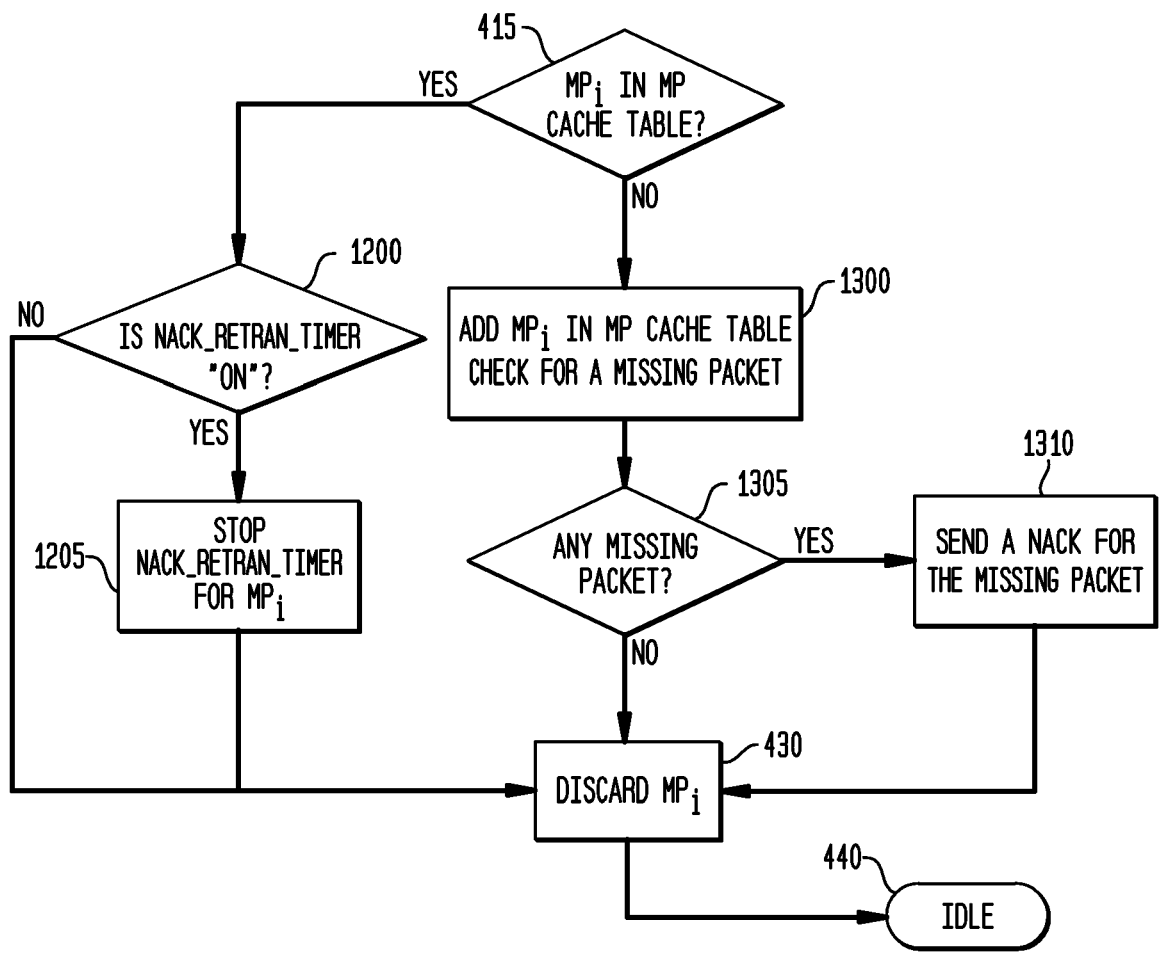

FIGS. 12-14 (A and B) illustrate a routing method according to the fourth embodiment of the invention. According to this embodiment, a multicast receiver node 20 can locally recover a missed multicast packet. A multicast receiver node 20 uses a negative acknowledgement to notify other nodes 10 that a multicast packet has not been received. A missing multicast packet is detected based upon a missing sequence number in a received packet. The detection is based upon a comparison of the sequence numbers of the received multicast packets.

A multicast packet arrives at a node 10, at block 400. The multicast packet includes a multicast group identifier, source identifier, a sequence number, a time-to-live (TTL) value and the data. The TTL value is the number of hops that the multicast packet is relayed. At each hop, the FN 90 reduces the TTL value. The TTL value functions to limit the number of times the same multicast data packet is forwarded.

The node 10 extracts a multicast group identifier from the packet to determine if the node 10 is a member of the multicast session, at block 405. This determination is based upon the multicast routing table. If the node 10 is not a member of the multicast session, the multicast packet is discarded without any other processing, at block 410. If the node 10 is a member of the multicast session, the node 10 determines if it is an FN 90 or a multicast receiver node 20, at block 800. If the node 10 is a multicast receiver node 20, the process moves to functional block 415 of FIG. 13.

At block 415, the multicast receiver node 20 determines if the incoming multicast packet is listed in the MP cache table (e.g., FIG. 15B, 500*c*).

If the multicast packet is not the same as any of the packets in the MP cache table 500*c*, the multicast receiver node 20 adds information about the received multicast packet to the MP cache table 500*c* and determines if a multicast packet is missing, at block 1300. The multicast receiver node 20 adds the multicast session identifier, source identifier, the sequence number, and the multicast packet data to the MP cache table 500*c*. The MP cache table 500*c* for the multicast receiver node 500*c* also includes a negative acknowledgement retransmission timer (NACK_Retran_Timer). The NACK_Retran_Timer is used to suppress or limit the number of multiple retransmissions of the same multicast packet from neighboring FNs 90 or multicast receiver nodes 20.

The time for the NACK_Retran_Timer can be variable dependent on the number of nodes, the type of data included in the data packet, the speed of motion of the nodes 10 and other user defined criterion. For example, a time of 12 ms can be used. If the data included in the message is a high priority message, the time can be shortened. Alternatively, if the message is a lower priority message, the time can be lengthened. A recovery delay depends on the value of the time. The smaller the time is, the shorter the delay. However, too small leads to many retransmissions, some of which might not be needed.

A multicast receiver node 20 detects a missing multicast packet by looking at the sequence numbers for all of the received multicast packets. The detection occurs a block 1305. For example; if a multicast receiver node 20 has received multicast packets with sequence numbers 10, 11, and 13, a multicast packet having the sequence number of 12 is missing.

If a multicast packet is missing, at block 1305, the multicast receiver node 20 multicasts a negative acknowledgement (NACK) for the multicast packet, at block 1310.

The NACK includes the multicast session identifier, source identifier and the sequence number for the missing multicast packet. Afterwards, the incoming multicast packet is discarded, at block 430. The multicast receiver node 20 becomes idle, at block 440.

If a multicast packet is missing, at block 1305, the multicast receiver node 20 discards the incoming multicast packet, at block 430. The multicast receiver node 20 becomes idle, at block 440.

At block 415, if the multicast packet is the same as any of the packets in the MP cache table 500c, the multicast receiver node 20 determines if the NACK_Retran_Timer for the multicast packet is "on" and not expired, at block 1200. This determination is based upon information from the MP cache table 500c. If the NACK_Retran_Timer is on (at block 1200) (same function block as illustrated in FIG. 12), the NACK_Retran_Timer is stopped, at block 1205 (same function block as illustrated in FIG. 12). The multicast receiver node 20 changes the status of the NACK_Retran_Timer to "off". This is done to suppress retransmission of the same multicast packet unnecessarily. The multicast receiver node 20 then discards the incoming multicast packet, at block 430. The multicast receiver node 20 becomes idle, at block 440.

If the NACK_Retran_Timer is "off" (at block 1200), the multicast receiver node 20 then discards the incoming multicast packet, at block 430. The multicast receiver node 20 becomes idle, at block 440.

Going back to FIG. 12, if, at block 800, the node 10 is an FN 90, the process proceeds to block 415 (FIG. 12).

If the multicast packet is not the same as any of the packets in the MP cache table (FIG. 15A, 500b), the FN 90 adds the received multicast packet to the MP cache table 500b, at block 420.

The FN 90 extracts the multicast group identifier, source identifier, the sequence number, the time-to-live (TTL) value and the data and adds this information to the MP cache table 500b. Additionally, the FN 90 initializes a retransmission counter to zero. The retransmission counter (s_mp_c) represents a number of times that a multicast packet can be retransmitted. In an embodiment, the number of times that a multicast message is retransmitted is limited to a preset maximum. The preset maximum can be the same for all nodes 10. In another embodiment, the preset maximum can be a variable for specific nodes, such as a GH or a source node 700.

The MP cache table is different for an FN 90 and a multicast receiver node 20. For an FN 90, the MP cache table 500b will include the multicast session identifier, source identifier, the sequence number, the multicast packet data, an acknowledgement status, a retransmission timer value, a retransmission counter, a TTL value for the multicast packet, and a negative acknowledgement retransmission timer (NACK_Retran_Timer). The acknowledgment status can be either "not Acknowledged" or "Acknowledged". The retransmission timer value can be either on or off. If the timer is on, the retransmission timer value will also include the initial set timer value and an indication when the retransmission timer value has expired. For a multicast receiver node 20, the MP cache table 500c includes only the multicast session identifier, source identifier and the sequence number.

At block 805, the FN 90 initializes the acknowledgement status to "not Acknowledged". The FN 90 can track which multicast packet has been acknowledged and received. Additionally, the FN 90 initializes the retransmission timer value to on and sets a timer with a retransmission time. The retransmission time can be varied dependent on the number of nodes, the type of data included in the data packet, the speed of motion of the FNs 90, and other user defined criterion.

At block 810, the retransmission counter is incremented by one, i.e., s_mp_c+1. After the retransmission counter is incremented, the FN 90 forwards the multicast packet once, at block 605. The FN 90 subtracts one from the TTL value of the multicast packets before forwarding. Therefore, the next hop FN will receive a multicast packet with a lower TTL value than the FN 90 that is sending the multicast packet. The FN 90 becomes idle, at block 440.

At block 415, if the multicast packet is the same as any of the packets in the MP cache table 500c, the multicast receiver node 20 determines if the NACK_Retran_Timer is "on" and not expired, at block 1200. This determination is based upon information from the MP cache table 500c. If the NACK_Retran_Timer is on (at block 1200), the NACK_Retran_Timer is stopped, at block 1205. The multicast receiver node 20 changes the status of the NACK_Retran_Timer to "off". This is done to suppress retransmission of the same multicast packet unnecessarily.

If the NACK_Retran_Timer is "off" (at block 1200), the process proceeds to block 815.

At block 815, the FN 90 compares the offset TTL value (In_MP_TTL+1) with the TTL value of the same multicast packet. The TTL value of the same multicast packet is retrieved from the MP cache table 500b. If the TTL value retrieved from the MP cache table 500b is not greater than the offset value, then the incoming multicast packet is ignored and discarded, at block 430. The multicast packet originated from an upstream node. The forwarding of the multicast packet is not acknowledged. The FN 90 becomes idle, at block 440.

If, at block 815, the TTL value retrieved from the MP cache table 500b is greater than the offset value, then the FN 90 determines if the multicast packet is already acknowledged, at block 820.

The FN 90 retrieves the acknowledgement status for the same multicast packet from the MP cache table 500b. If the same multicast packet has already been acknowledged, then the incoming multicast packet is ignored and discarded, at block 430. The FN 90 becomes idle, at block 440. There is no change in the MP cache table 500b. If the same multicast packet has not been acknowledged, at block 820, the method processed to block 825.

At block 825, the FN 90 stops the retransmission timer. Additionally, the FN 90 changes the retransmission timer value in the MP cache table 500b to "off" and changes the acknowledgement status to "Acknowledged". Afterwards, the incoming multicast packet is discarded, at block 430. The FN 90 becomes idle, at block 440. The forwarding of the multicast packet is acknowledged.

Figure 14A:
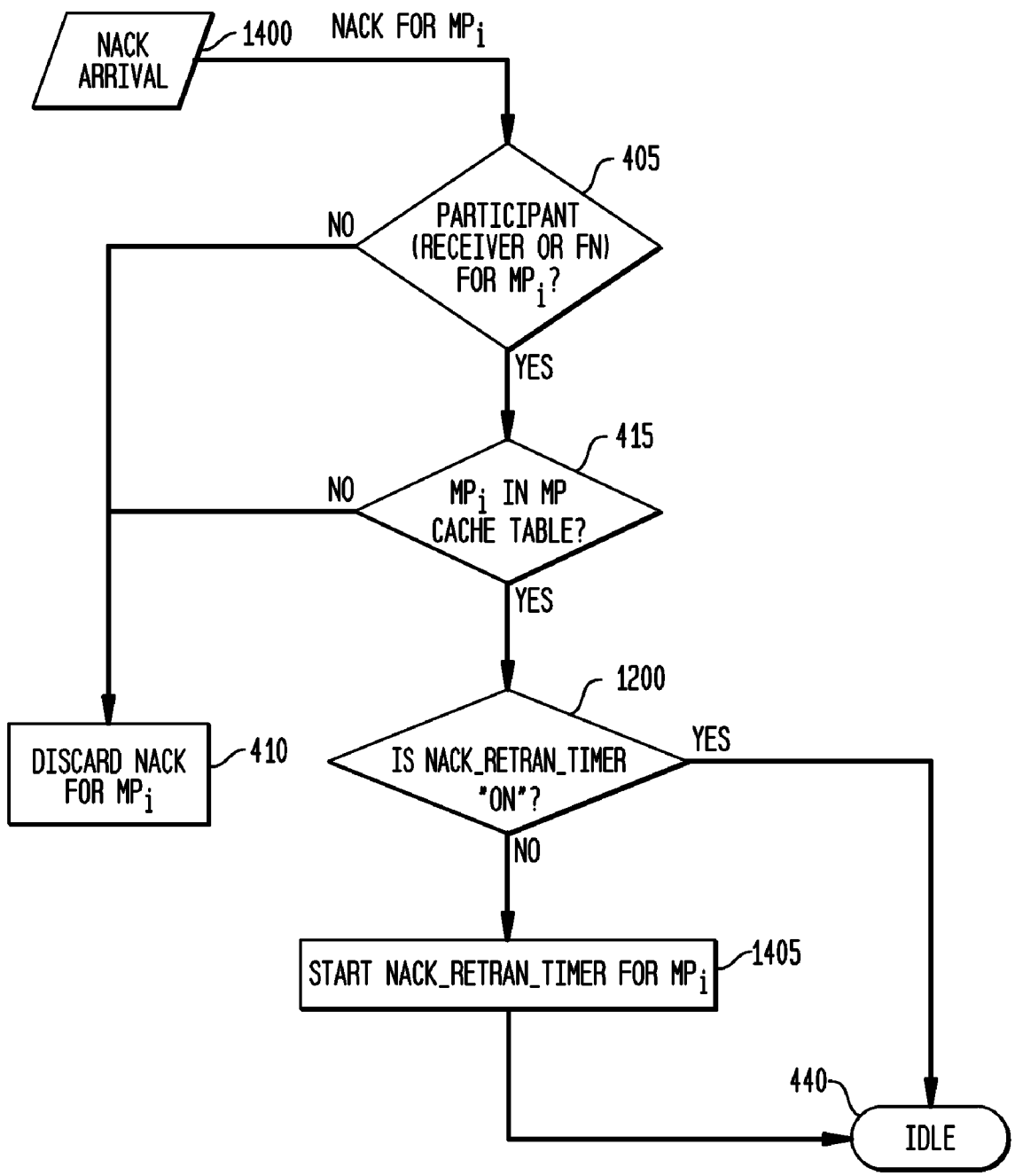

FIG. 14A illustrates the functional blocks for the processing of a NACK. The operational process for NACK processing is the same for an FN 90 and a multicast receiver node.

At block 1400, the node 10 receives the NACK packet. The node 10 determines if the packet is a NACK packet based upon the information contained therein. The node 10 then determines if it is a multicast participant, i.e. an FN 90 or a multicast receiver node 20, at block 405.

The node 10 extracts a multicast group identifier from the received NACK packet to determine if the node 10 is a member of the multicast session, at block 405. This determination is based upon the multicast routing table. If the node 10 is not a member of the multicast session, the NACK for the packet is discarded without any other processing, at block 410. If the node 10 is a member of the multicast session, the node 10 determines if the multicast packet is in the MP cache table (500b or 500c), at block 415, e.g., checks if the information entry for the multicast packet is listed in the MP cache table (500b or 500c).

At block 415, if the multicast packet is the same as any of the packets in the MP cache table, the node 10 determines if the NACK_Retran_Timer is "on", at block 1200. This determination is based upon information from the MP cache table (500b or 500c). If the NACK_Retran_Timer is on (at block 1200), the node 10 becomes idle, at block 440. On the other hand, if the NACK_Retran_Timer is "off" (at block 1200), the node 10 sets the NACK_Retran_Timer to a predetermined value, at block 1405. In other words, the node 10 changes the status of the NACK_Retran_Timer to "on". The NACK_Retran_Timer starts timing the NACK period.

Figure 14B:
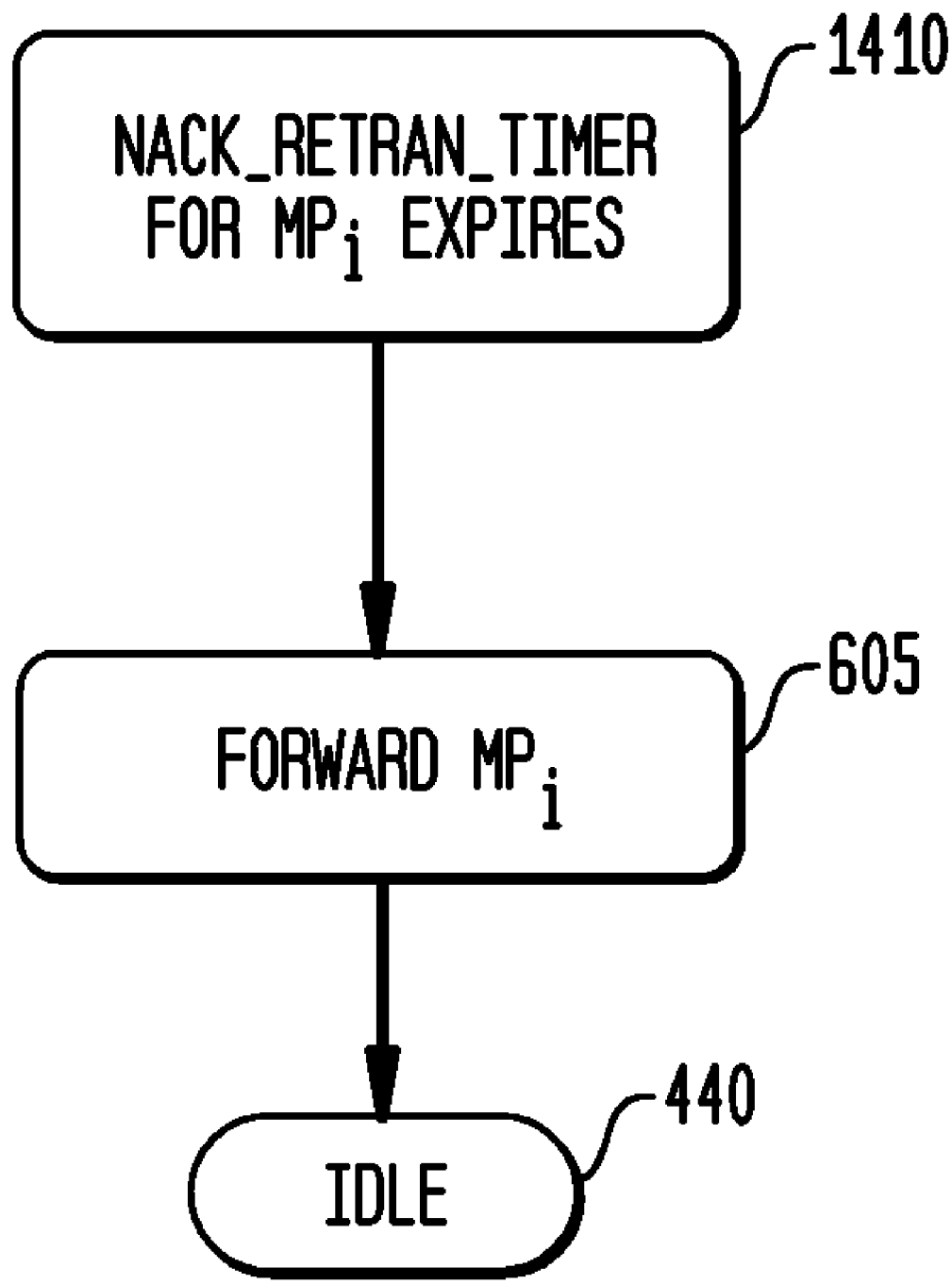

FIG. 14B illustrates the functional blocks for the retransmitting the multicast packet upon the expiration of the NACK_Retran_Timer. At block 1410, the NACK_Retran_Timer expires. The node 10 changes the status of the NACK_Retran_Timer to "off". At block 605, the node 10 retransmits or forwards the multicast packet. The node 10 becomes idle, at block 440.

FIG. 15A illustrates an example of the MP cache table 500b for an FN 90 according to the fourth embodiment of the invention. As depicted, the MP cache table 500b includes two different multicast packets, ($MP_1$ and $MP_2$). For each multicast packet, the MP cache table 500b includes a multicast session identifier (GroupAdd), source identifier, the sequence number for the multicast packet (SeqNum), the multicast packet data (MP cache), the acknowledgment status (ACK status), a retransmission timer (Retran_Timer), a retransmission counter (s_mp_c), a TTL value for the multicast packet (C_MP_TTL) and a negative acknowledgement retransmission timer (NACK_Retran_Timer). As depicted in FIG. 15A, the NACK_Retran_Timer is on for one of the multicast packets.

FIG. 15B illustrates an example of the MP cache table 500c for a multicast receiver node according to the fourth embodiment of the invention. As depicted, the MP cache table 500c includes two different multicast packets, ($MP_1$ and $MP_2$). For each multicast packet, the MP cache table 500c includes a multicast session identifier (GroupAdd), source identifier, the sequence number for the multicast packet (SeqNum), and a negative acknowledgement retransmission timer (NACK_Retran_Timer).

FIG. 16 illustrates a routing method according to the fifth embodiment of the invention. The fifth embodiment of the invention is similar to the third embodiment except that the multicast packet is relayed multiple times.

A multicast packet arrives at a node 10, at block 400. The multicast packet includes a multicast group identifier, source identifier, a sequence number, a time-to-live (TTL) value, and the data. The TTL value is the number of hops that the multicast packet is relayed.

The node 10 extracts a multicast group identifier from the packet to determine if the node 10 is a member of the multicast session, at block 405. This determination is based upon the multicast routing table. If the node 10 is not a member of the multicast session, the multicast packet is discarded without any other processing, at block 410. If the node 10 is a member of the multicast session, the node 10 determines if it is an FN 90 or a multicast receiver node 20, at block 800. If the node 10 is a multicast receiver node 20, the process moves to functional block 415 of FIG. 10. If the node 10 is an FN 90 for the multicast session, the FN 90 determines if the multicast packet is in the MP cache table (e.g. 500a), at block 415 (FIG. 16).

If the multicast packet is not the same as any of the packets in the MP cache table 500a, the FN 90 adds the received multicast packet to the MP cache table 500a, at block 420.

The FN 90 extracts the multicast group identifier, source identifier, the sequence number, the time-to-live (TTL) value and the data and adds this information to the MP cache table 500a. Additionally, the FN 90 initializes the retransmission counter to zero. The retransmission counter (s_mp_c) represents a number of times that a multicast packet can be retransmitted. Similar to the third embodiment, the MP cache table is different for an FN 90 and a multicast receiver node 20. The MP cache table (e.g., 500a and 500) includes the same information as the third embodiment.

At block 805, the FN 90 initializes the acknowledgement status to "not Acknowledged". The FN 90 can track which multicast packet has been acknowledged and received. Additionally, the FN 90 initializes the retransmission timer value to "on" and sets a timer with a retransmission time. The retransmission time can be variable dependent on the number of nodes, the type of data included in the data packet, the speed of motion of the FNs 90 and other user defined criterion.

At block 810, the retransmission counter is incremented by one, i.e., s_mp_c+1. After the retransmission counter is incremented, the FN 90 forwards the multicast packet N times, at block 435. In an embodiment, the FN 90 forwards the multicast packet N-consecutive times. The number "N" times that the packet is forwarded are preset and can be varied. There is a tradeoff is an increase in the delivery ratio and the increase in data overhead. As the number "N" increases there is a significant increase in the data overhead but the delivery ratio also increases. In another embodiment, the FN 90 simultaneously forwards the packet N times.

The FN 90 subtracts one from the TTL value of the multicast packet before forwarding. Therefore, the next hop FN will receive a multicast packet with a lower TTL value than the FN 90 that is sending the multicast packet. The FN 90 becomes idle, at block 440.

If the multicast packet is the same as any of the packets in the MP cache table 500a, the method proceeds to block 815.

The FN 90 determines the TTL value for the incoming multicast packet. As noted above, the TTL value is used to control the number of hops for a specific multicast packet. Additionally, in this embodiment, the TTL value is also used to determine the relative location of a transmitting and receiving node 10. Specifically, each time a multicast packet is forwarded, the node 10 subtracts one from the TTL value (e.g., TTL−1). A multicast packet received from a node 10 that is downstream from a particular FN 90 will have a TTL value that is less than the TTL value for same multicast packet that was forwarded by the FN 90. A multicast packet received from a node 10 that is upstream from a particular FN 90 will have a TTL value that is greater than the TTL value for the same multicast packet that was forwarded by the FN 90. A multicast packet received from a node 10 that is the same number of hops as the particular FN 90 will have the same TTL value.

The FN 90 adds an offset value of one to the determined TTL value to account for the forwarding of the multicast packet in the first instance by the FN 90. This generates an offset TTL value At block 815, the FN 90 compares the offset TTL value (In_MP_TTL+1) with the TTL value of the same multicast packet. The TTL value of the same multicast packet is retrieved from the MP cache table. If the TTL value retrieved from the MP cache table is not greater than the offset value, then the incoming multicast packet is ignored and discarded, at block 430. The multicast packet originated from an upstream node. The forwarding of the multicast packet is not acknowledged. The FN 90 becomes idle, at block 440.

If, at block 815, the TTL value retrieved from the MP cache table 500*a* is greater than the offset value, then the FN 90 determines if the multicast packet is already acknowledged, at block 820.

The FN 90 retrieves the acknowledgement status for the same multicast packet from the MP cache table 500*a*. If the same multicast packet has already been acknowledged, then the incoming multicast packet is ignored and discarded, at block 430. The FN 90 becomes idle, at block 440. There is no change in the MP cache table 500*a*. If the same multicast packet has not been acknowledged, at block 820, the method proceeds to block 825.

At block 825, the FN 90 stops the retransmission timer. Additionally, the FN 90 changes the retransmission timer value in the MP cache table 500*a* to "off" and changes the acknowledgement status to "Acknowledged". Afterwards, the incoming multicast packet is discarded, at block 430. The FN 90 becomes idle, at block 440. The forwarding of the multicast packet is acknowledged.

The remaining functional blocks are identical to the functional blocks depicted in FIGS. 9 and 10 and, therefore, will not be described in greater detail.

Figure 17:
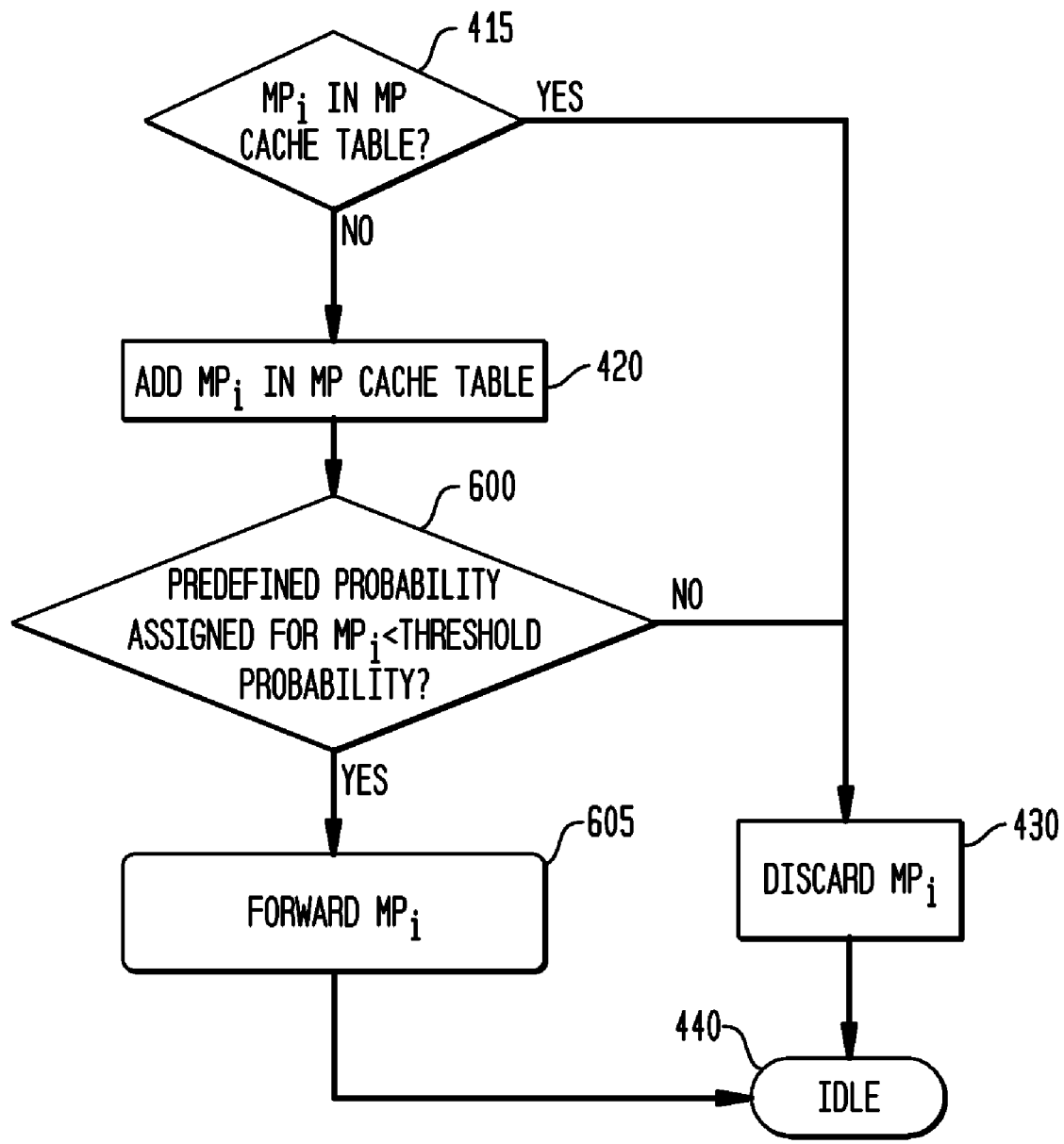
FIG. 17 illustrates a method for routing a multicast packet by a multicast receiver node according to the sixth embodiment of the invention.

FIG. 17 illustrates the functional blocks for a multicast receiver node 20 according to the sixth embodiment of the invention. The sixth embodiment of the invention is a combination of functional blocks of the second and third embodiment of the invention. The functional blocks of the FN 90 are identical to the functional blocks illustrated in FIGS. 8 and 9 and, therefore, will not be described again in detail.

At block 415, the multicast receiver node 20 determines if the multicast packet is in the MP cache Table (e.g., 500*a*). If the multicast packet is in the MP cache table 500*a*, the multicast packet is discarded, at block 430. The multicast receiver node 20 becomes idle, at block 440.

If the multicast packet is not in the MP cache table 500*a*, i.e., not the same, the information contained in the multicast packet is added to the MP cache table 500*a*. At block 600, the multicast receiver node 20 compares a random probability assigned for the multicast packet with its probability threshold value. If the random probability assigned for the multicast packet is less than the probability threshold value, the multicast receiver node 20 forwards the received multicast packet, at block 605. The multicast receiver node 20 then becomes idle, at block 440.

If the random probability assigned for the multicast packet is greater than or equal to the probability threshold value, the multicast receiver node 20 discards the received multicast packet, at block 430. The multicast receiver node 20 then becomes idle, at block 440.

Figure 18:
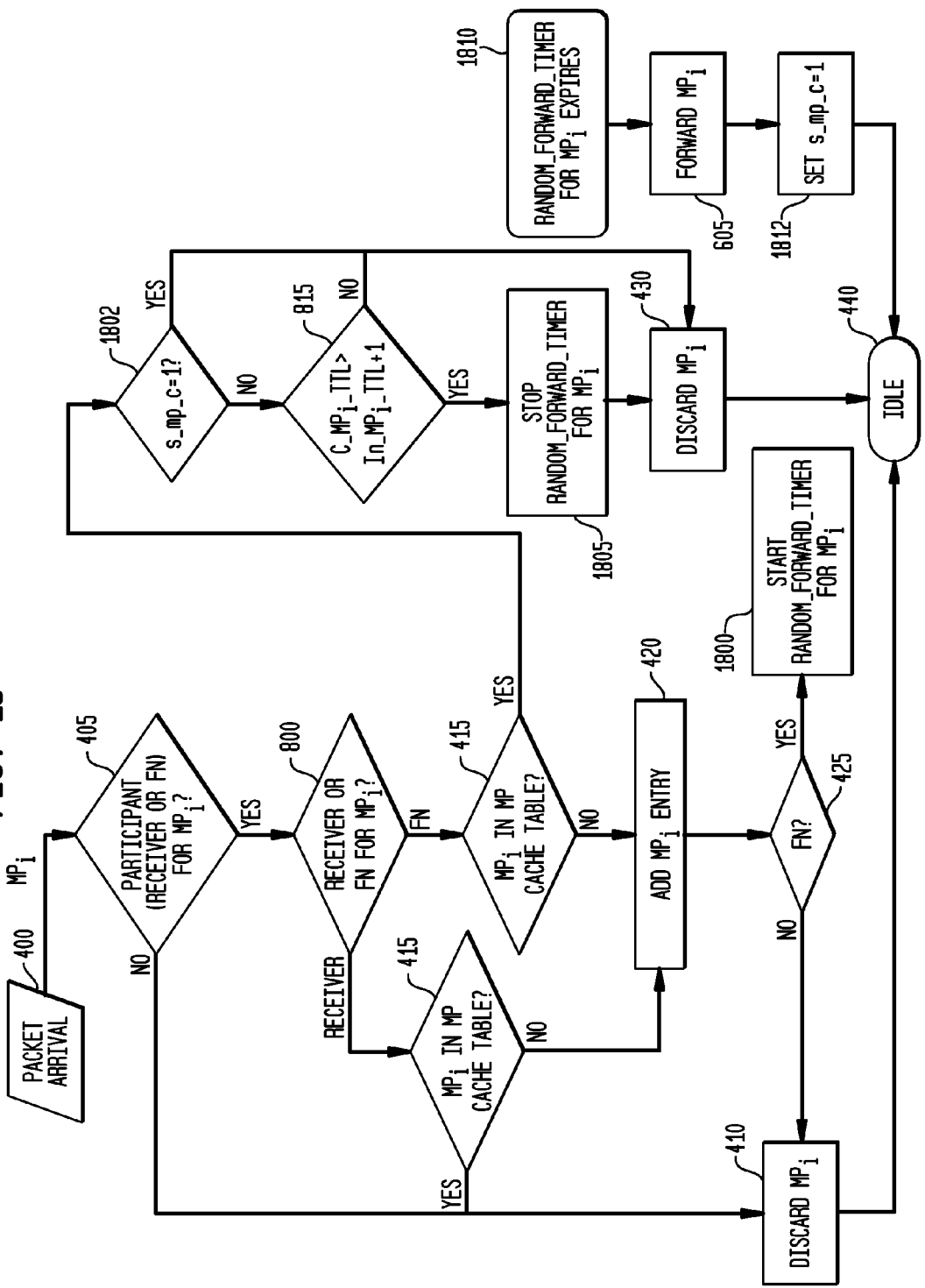
FIG. 18 illustrates a method for routing a multicast packet according to a seventh embodiment of the invention.

FIG. 18 illustrates a routing method according to the seventh embodiment of the invention. According to the seventh embodiment, transmission of the multicast packet is suppressed based upon a preset criterion.

As depicted in FIG. 18, a multicast packet arrives at a node 10, at block 400. The multicast packet includes a multicast group identifier, source identifier, a sequence number, a time-to-live (TTL) value, and the data. The TTL value is the number of hops that the multicast packet is relayed.

The node 10 extracts a multicast group identifier from the packet to determine if the node 10 is a member of the multicast session, at block 405. This determination is based upon the multicast routing table. If the node 10 is not a member of the multicast session, the multicast packet is discarded without any other processing, at block 410. If the node 10 is a member of the multicast session, the node 10 determines if it is an FN 90 or a multicast receiver node, at block 800. If the node 10 is a multicast receiver node, the process moves to functional block 415 (for the receiver). If the node 10 is an FN 90 for the multicast session, the FN 90 determines if the multicast packet is in the MP cache table (e.g., 500*d*), at block 415 (for the FN 90).

If the multicast packet is not the same as any of the packets in the MP cache table 500*d*, the FN 90 or the multicast receiver node 20 adds the received multicast packet to the MP cache table 500*d*, at block 420.

The FN 90 extracts the multicast group identifier, source identifier, a sequence number, a time-to-live (TTL) value and the data and adds this information to the MP cache table 500*d*. Additionally, the FN 90 initializes a retransmission counter to zero. The retransmission counter (s_mp_c) represents a number of times that a multicast packet can be retransmitted. In this embodiment, the value of s_mp_c is either "0" or "1". The MP cache table 500*d* for the FN 90 also includes a random forwarding timer.

The MP cache table is different for an FN 90 and a multicast receiver node 20. The MP cache table 500 of a multicast receiver node 20 includes the multicast session identifier, source identifier and the sequence number for the multicast packet. Therefore, at block 420, the multicast receiver node 20 adds the multicast session identifier, source identifier and the sequence number to its MP cache table 500.

At block 425, the node 10 determines if it is an FN 90 for the multicast packet. This determination is based upon information in the forwarding table and the MP cache table (e.g., 500). If the node 10 is not an FN 90 for the multicast packet, the incoming multicast packet is discarded, at block 419. If the node is an FN 90, the FN sets a forwarding timer to a random value, at block 1800. The random value prevents the forwarding of the multicast packet. The FN 90 will only forward the multicast packet at the expiration of the random value, i.e., Random_forward_Timer expires.

If at block 415, the multicast packet in already in the MP cache table 500*d*, the FN 90 determined if the FN 90 has forwarded the packet already, i.e., s_mp_c=1, at block 1802. If the counter (s_mp_c) equals 1, the packet has been already forwarded. If the counter(s_mp_c) equals 0, the packet has not been forwarded. The FN retrieves the counter value from the MP cache table 500*d*. If the counter (s_mp_c) equals 1, at block 1802, the multicast packet is discarded at step 430 without being forwarded. If the counter (s_mp_c) equals 0, at block 1802, the FN 90 determines the TTL value for the incoming multicast packet (block 815). As noted above, the TTL value is used to control the number of hops for a specific multicast packet. Additionally, in this embodiment, the TTL value is also used to determine the relative location of a transmitting and receiving node 10. The FN 90 adds an offset value of one to the determined TTL value to account for the forwarding of the multicast packet in the first instance by the FN 90. This generates an offset TTL value At block 815, the FN 90 compares the offset TTL value (In_MP_TTL+1) with the TTL value of the same multicast packet. The TTL value of the same multicast packet is retrieved from the MP cache table 500*d*. If the TTL value retrieved from the MP cache table 500*d* is not greater than the offset value, then the incoming multicast packet is discarded (at block 430) and FN 90 becomes idle, at block 440. The multicast packet originated from an upstream node or peer node. If, at block 815, the TTL value retrieved from the MP cache table 500d is greater than the offset value, e.g., the incoming multicast packet originated from a downstream FN 90 and that there is no need for the FN 90 to forward the multicast packet.

At block 1805, the FN stops the Random_Forward_Timer for the multicast packet. In other words, the FN changes the status of the Random_Forward_Timer from "on" to "off." Afterwards, the multicast packet is discarded, at block 430. The FN 90 becomes idle, at block 440.

If the Random_Forward_Timer expires, the FN 90 forwards the multicast packet. At block 1810, the Random_Forward_Timer expires, the FN 90 changes the status of the Random_Forward_Timer from "on" to "off." Afterwards, the FN 90 forwards the multicast packet, at block 605. The FN 90 decreases the value of the TTL value by one. After decrease the value of the TTL in the multicast packet by 1, the FN 90 forwards the multicast packet. Additionally, after forwarding the multicast packet, the FN sets the retransmission counter (s_mp_c) to 1, at block 1812. The FN 90 becomes idle, at block 440. In accordance with the seventh embodiment, forwarding of the multicast packet by an FN 90 is lightly suppressed.

Figure 19:
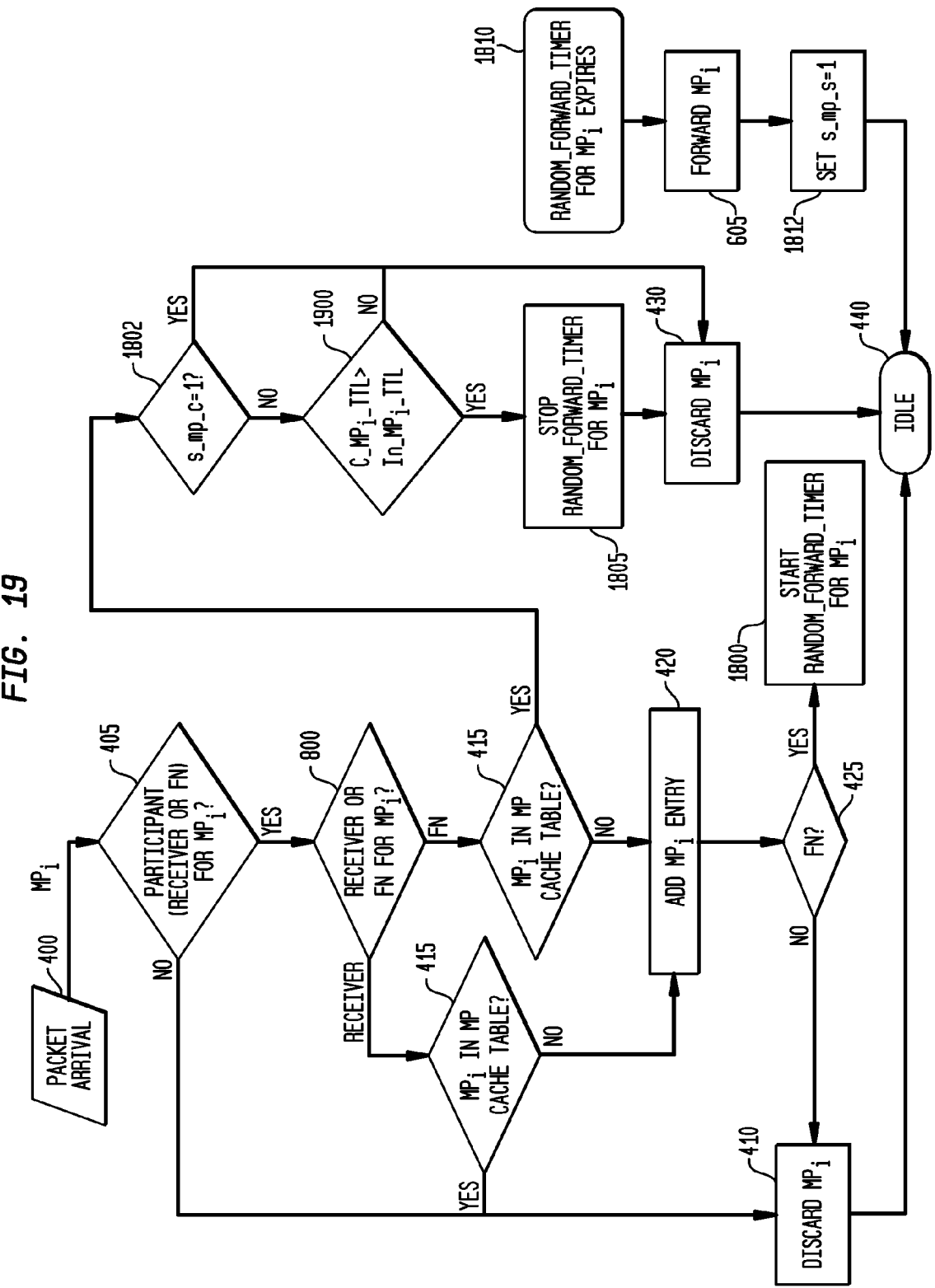
FIG. 19 illustrates a method for routing a multicast packet according to an eighth embodiment of the invention.

FIG. 19 illustrates the routing method according to the eighth embodiment of the invention. By using the routing method according to the eighth embodiment of the invention, forwarding of the multicast packet by an FN 90 is heavily suppressed. Most of the functional blocks depicted in FIG. 19 are the same as FIG. 18 and, therefore, will not be described in detail. The difference between the seventh and eighth embodiment is the comparison of the TTL value in block 1900 (as opposed to block 815). At block 1900, the TTL value of the incoming multicast packet is compared with the stored TTL value from the MP cache table (e.g. 500d).

There is no offset value added to the TTL value of the incoming multicast packet.

If the TTL value retrieved from the MP cache table (e.g. 500d) is not greater than the incoming TTL value, then the incoming multicast packet is discarded (at block 430) and FN 90 becomes idle, at block 440. The multicast packet originated from an upstream node. If, at block 1900, the TTL value retrieved from the MP cache table 500d is greater than the incoming TTL value, e.g., the incoming multicast packet originated from a peer or downstream node. The FN 90 gives up forwarding the multicast packet and stops the Random_Forward_Timer for the multicast packet.

Figure 20:
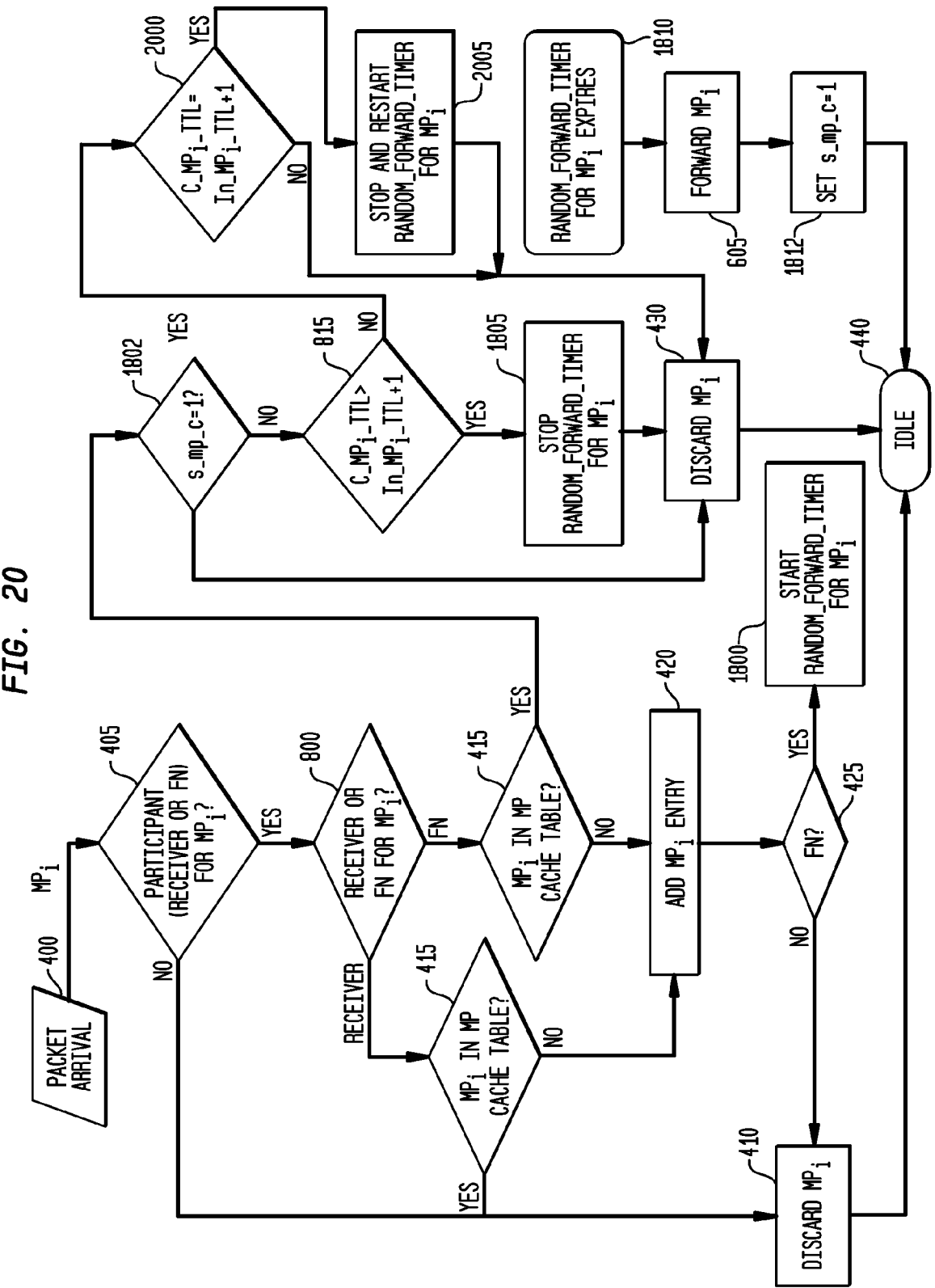
FIG. 20 illustrates a method for routing a multicast packet according to a ninth embodiment of the invention.

FIG. 20 illustrates a routing method according to the ninth embodiment of the invention. The ninth embodiment of the invention uses a two-stage suppression method. FIG. 20 is similar to FIG. 18, except that two additional functional blocks are added. The same functional blocks will not be described again.

As described above, at block 815, the FN 90 compares the offset TTL value (In_MP_TTL+1) with the TTL value of the same multicast packet. The TTL value of the same multicast packet is retrieved from the MP cache table (e.g., 500d). If the TTL value retrieved from the MP cache table 500d is not greater than the offset value, then the incoming multicast packet is discarded 9 (at block 430) and FN 90 becomes idle, at block 440. However, in the ninth embodiment, if the TTL value retrieved from the MP cache table 500d is not greater than the offset value, the FN determines if the TTL value retrieved from the MP cache table is equal to the offset value, at block 2000. If the TTL value retrieved from the MP cache table 500d is not equal to the offset value, then the incoming multicast packet is discarded and FN 90 becomes idle, at block 440. However, if the TTL value retrieved from the MP cache table 500d is equal to the offset value, i.e., the multicast packet is received from a peer neighbor, then the Random_Forward_Timer for the multicast packet is stopped and reset to another random value, at block 2005. The Random_Forward_Timer for the multicast packet is extended. This extension of the time increases the chance of receiving an incoming multicast packet with the offset TLL value less than the TTL value for the same multicast packet before the Random_Forward_Timer expires. Accordingly, unnecessary forwarding is suppressed and less duplicate packets are generated.

FIG. 21 illustrates an example of the MP cache table 500d for an FN 90 according to the seventh through ninth embodiments of the invention. As depicted, the MP cache table 500d includes two different multicast packets, ($MP_1$ and $MP_2$). For each multicast packet, the MP cache table 500b includes a multicast session identifier (GroupAdd), the source identifier, the sequence number for the multicast packet (SeqNum), the multicast packet data (MP cache), a retransmission counter (s_mp_c), a TTL value for the multicast packet (C_MP_TTL), and a random forward timer (Random_Forward_Timer). As depicted in FIG. 21, the Random_Forward_Timer is on for one of the multicast packets.

The ninth embodiment of the invention can be applied to a broadcast packet as well as a multicast packet. However, in order to support broadcast communication, all nodes become a FN 90.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for routing a multicast message comprising the steps of:

receiving a multicast message including at least a message, a source identifier, a sequence number, a time-to-live value and a multicast group destination;

determining if the multicast group destination is in a multicast forwarding table;

determining if the message has been previously received;

adding the multicast message to the multicast forwarding table if it is determined that the message has not been previously received;

determining if a node that received the multicast message is a forwarding node;

setting, randomly a wait time for forwarding the multicast message if the node is a forwarding node;

stopping the randomly set wait time if a second multicast message is received from a downstream node including at least the same message, source identifier, sequence number, and multicast group destination within the randomly set wait time; and forwarding the multicast message at the expiration of the wait time;

wherein a determination of whether a second multicast message is received from a downstream node comprises the steps of:

extracting a time-to-live value from the second multicast message;

adding a preset number to the time-to-live value to generate an offset time-to-live value;

retrieving a time-to-live value from the multicast forwarding table for the multicast message that includes the same message; and comparing the offset time-to-live value with the retrieved time-to-live value, wherein the wait time is stopped, if the retrieved time-to-live value is greater than the offset time-to-live value.

2. The method for routing a multicast message according to claim 1, wherein the wait time is reset to a random value if the retrieved time-to-live value is equal to the offset time-to-live value.

3. A method for routing a multicast message comprising the steps of:
  receiving a multicast message including at least an included message, a source identifier, a sequence number, a time-to-live value, and a multicast group destination;
  determining if the multicast group destination is in a multicast forwarding table;
  determining if the included message has been previously received; wherein if the included message has been previously received, the method comprises the steps of:
  adding a preset number to the time-to-live value to generate an offset time-to-live value;
  comparing the offset time-to-live value with a time-to-live value in the multicast forwarding table; and
  discarding, without forwarding, the multicast message if the offset time-to-live value is greater than or equal to the time-to-live value in the multicast forwarding table.

4. A method for routing a multicast message comprising the steps of:
  receiving a multicast message including at least an included message, a source identifier, a sequence number, a time-to-live value, and a multicast group destination;
  determining if the multicast group destination is in a multicast forwarding table;
  determining if the included message has been previously received; wherein if the included message has been previously received, the method comprises the steps of:
  adding a preset number to the time-to-live value to generate an offset time-to-live value;
  comparing the offset time-to-live value with a time-to-live value in the multicast forwarding table; and
  discarding, without forwarding, the multicast message if the offset time-to-live value is greater than or equal to the time-to-live value in the multicast forwarding table;
  wherein if the multicast message has not been previously received, the method comprises the steps of:
  setting an acknowledgement flag to not acknowledged;
  incrementing a retransmission counter;
  setting a retransmission time to a predetermined value; and
  forwarding the multicast message.

5. A method for routing a multicast message comprising the steps of:
  receiving a multicast message including at least an included message, a source identifier, a sequence number, a time-to-live value, and a multicast group destination;
  determining if the multicast group destination is in a multicast forwarding table;
  determining if the included message has been previously received; wherein if the included message has been previously received, the method comprises the steps of:
  adding a preset number to the time-to-live value to generate an offset time-to-live value;
  comparing the offset time-to-live value with a time-to-live value in the multicast forwarding table; and
  discarding, without forwarding, the multicast message if the offset time-to-live value is greater than or equal to the time-to-live value in the multicast forwarding table;
  wherein if the offset time-to-live value is less than the time-to-live value in the multicast forwarding table, the method further comprises the steps of:
  setting an acknowledgement flag to acknowledged; and
  stopping a retransmission time.

* * * * *

UNITED STATES PATENT AND TRADEMARK OFFICE
CERTIFICATE OF CORRECTION

PATENT NO. : 8,068,491 B2
APPLICATION NO. : 12/069815
DATED : November 29, 2011
INVENTOR(S) : Chen et al.

It is certified that error appears in the above-identified patent and that said Letters Patent is hereby corrected as shown below:

In the Specification

In Column 10, Line 57, delete "TTL value" and insert -- TTL value. --, therefor.

In Column 12, Line 67, delete "example;" and insert -- example, --, therefor.

In Column 16, Line 64, delete "value" and insert -- value. --, therefor.

In Column 18, Line 58, delete "TTL value" and insert -- TTL value. --, therefor.

Signed and Sealed this
Twenty-seventh Day of January, 2015

Michelle K. Lee
*Deputy Director of the United States Patent and Trademark Office*